United States Patent
Vanova

(10) Patent No.: US 8,371,858 B2
(45) Date of Patent: Feb. 12, 2013

(54) METHOD AND ELECTRONIC CALCULATING DEVICE FOR TEACHING ARITHMETIC

(76) Inventor: Apolonia Vanova, London (CA)

( * ) Notice: Subject to any disclaimer, the term of this patent is extended or adjusted under 35 U.S.C. 154(b) by 1320 days.

(21) Appl. No.: 11/374,621

(22) Filed: Mar. 14, 2006

(65) Prior Publication Data

US 2007/0218433 A1    Sep. 20, 2007

(51) Int. Cl.
  *G09B 1/00*    (2006.01)
  *G09B 5/00*    (2006.01)
  *G06F 13/00*   (2006.01)

(52) U.S. Cl. ......... 434/201; 434/191; 434/205; 708/162

(58) Field of Classification Search ................ 434/201, 434/190, 188, 317, 191, 205, 209; 708/162
See application file for complete search history.

(56) References Cited

U.S. PATENT DOCUMENTS

| | | | |
|---|---|---|---|
| 4,016,411 A | 4/1977 | Genin | |
| 4,117,607 A | 10/1978 | Gill | |
| 4,340,374 A | 7/1982 | Culley | |
| 4,340,375 A | 7/1982 | Sakaue et al. | |
| 4,548,585 A * | 10/1985 | Kelly | 434/195 |
| 5,139,423 A | 8/1992 | McCormack et al. | |
| 5,219,289 A | 6/1993 | Derr | |
| 5,219,291 A * | 6/1993 | Fong et al. | 434/323 |
| 5,346,399 A * | 9/1994 | Sakow | 434/201 |
| 5,450,095 A | 9/1995 | Nagoya | |
| 5,520,541 A | 5/1996 | Shedeur | |
| 5,529,497 A * | 6/1996 | Bigold | 434/191 |
| 5,596,698 A * | 1/1997 | Morgan | 715/863 |
| 5,727,950 A * | 3/1998 | Cook et al. | 434/350 |
| 5,732,001 A * | 3/1998 | Nakayama et al. | 708/162 |
| 5,738,524 A * | 4/1998 | Tsao | 434/210 |
| 5,825,001 A | 10/1998 | Oba et al. | |
| D412,017 S | 7/1999 | Sramek et al. | |
| 5,971,269 A * | 10/1999 | Baguley | 235/68 |
| 6,142,784 A | 11/2000 | Wood | |
| 6,716,033 B1 * | 4/2004 | Lassowsky | 434/205 |

(Continued)

FOREIGN PATENT DOCUMENTS

| EP | 0762292 | 3/1997 |
|---|---|---|
| GB | 2130782 A | 6/1984 |

(Continued)

OTHER PUBLICATIONS

Eric Rechlin: "Upcoming Qonos ScientificPDA" (online), Feb. 17, 2006, pp. 1-5, XP002449449, retrieved from the Internet: http://www.hpcalc.org/qonos.php.

(Continued)

*Primary Examiner* — Xuan Thai
*Assistant Examiner* — Peter Egloff

(57) ABSTRACT

A method of teaching basic arithmetical calculations is embodied in a novelty electronic graphic calculating device having a user interface for displaying method steps. The method involves displaying two or more collections of individual icons associated with two or more operands; selecting an arithmetical operation to be performed on the two or more operands; regrouping the individual icons into a collection of individual icons associated with an answer to the operation on the operands; and, displaying the collection of individual icons associated with the answer in sets having a maximum of ten icons each. The method permits visual regrouping and carry-over for teaching and learning mental computation of the four basic arithmetic skills of addition, subtraction, multiplication and division.

21 Claims, 15 Drawing Sheets

U.S. PATENT DOCUMENTS

| | | | |
|---|---|---|---|
| 6,755,658 B2* | 6/2004 | Frieman | 434/191 |
| 6,801,751 B1 | 10/2004 | Wood et al. | |
| 6,856,318 B1 | 2/2005 | Lewak | |
| 7,052,279 B1* | 5/2006 | Losq | 434/191 |
| 2002/0197589 A1* | 12/2002 | Wood et al. | 434/201 |
| 2003/0180699 A1* | 9/2003 | Resor | 434/322 |
| 2004/0023196 A1* | 2/2004 | Karabaic | 434/188 |
| 2004/0214146 A1 | 10/2004 | Harris et al. | |
| 2005/0114776 A1 | 5/2005 | Wood et al. | |
| 2006/0024649 A1* | 2/2006 | Vernon | 434/201 |

FOREIGN PATENT DOCUMENTS

| | | |
|---|---|---|
| JP | 7093257 | 4/1995 |
| JP | 2001-194982 | 7/2001 |
| JP | 2002-023611 | 1/2002 |

OTHER PUBLICATIONS

Dave Conabree: "Review: Samsung Nexio S160 5" PDA (online) Jun. 13, 2003, pp. 1-2, XP002449436 Retrieved from the Internet: http://www.mobilemag.com/2003/06/13/review-samsung-n.

Nagoya Takehiro, English Abstract of Japanese Publication No. JP7093257, published Apr. 7, 1995.

G. Plouffe, CIPO Office Communication issued Sep. 26, 2007 in relation to Canadian Patent Application No. 2,539,717 filed Mar. 13, 2006.

A. Mian, CIPO Office Communication issued Dec. 12, 2008 in relation to Canadian Patent Application No. 2,539,717 filed Mar. 13, 2006.

Mian, Ali. Canadian Intellectual Property Office Examiner's Report dated Nov. 7, 2011, in relation to Canadian Patent Application No. 2,539,717, 3 pages.

* cited by examiner

METHOD AND ELECTRONIC CALCULATING DEVICE FOR TEACHING ARITHMETIC

FIELD OF THE INVENTION

The present invention relates to a method of teaching arithmetic on an electronic calculating device and to an electronic calculating device for use in teaching arithmetic.

BACKGROUND OF THE INVENTION

Currently, educators teach the four basic arithmetical operations (addition, subtraction, multiplication and division) to young children through the use of paper/pencil tasks of equations, through the use of manipulatives, such as flash cards and rulers, and through the use of different primary mechanical calculators and other tools. Today, there is great emphasis on the use of electronic calculators, especially in math, for calculating, learning and drilling the four basic operations. However, by using a regular calculator, the user is able to find-out the correct or incorrect answer but not the understanding of the method of regrouping and carry-over in the base ten system. Further more, the user finds it difficult to understand the logical manipulation of numbers and thus has difficulty developing a firm basis for mental computation. Current methods of teaching math on electronic calculators to young children is counter-intuitive and does not satisfy their naturally inquisitive character to fully understand the four basic math concepts and operations.

Children exposed to learning the four basic math concepts and skills at the age of 4½-5 years and older are just beginning to develop their logical/abstract thinking skills. They also have the ability to lay a firm basis for their flourishing mental computation skill upon which their future math success is based. However, it is not uncommon to encounter a young adult who has difficulty performing the basic arithmetical operations in the absence of an electronic calculator, especially if one has to add two two-digit numbers. Clearly, there is a lack of fundamentals of the basic logical mental computation skill, which can be and should be developed from early childhood.

Usually, children learn best when information is presented through a combination of visualization, hearing and touch. In general children have different learning styles and therefore they may be categorized as "visual learners", "auditory learners" or "tactile learners." Some children may have particular deficits in visual, auditory or tactile processing which are more or less serious. An increasing number of children have ADD Attention Deficit Disorder or ADHD Attention Deficit Hyperactivity Disorder that may partially foreclose a mode of learning. But when children are able to hold and manipulate a math calculator that provides a built in method for adding, subtracting, multiplying and dividing along with visual, aural and/or tactile stimulation, math concepts have a far better chance of being understood and retained.

There are a variety of different colorful calculators on the market and used at schools with display screens, input keys and function controls. However, none of those calculators display the method and provide visual, aural, and tactile stimuli while the child uses the calculator.

The calculator MathShark™ for ages 6 and up displays math problems both in horizontal and vertical form as so called "flash cards" where users are to use the key pad to enter the answers to the presented math problem. Further, it is equipped with two auditory sounds and green and red light to indicate the correctness of the answers. Although capable of more functions such as decimals, fractions and percents the MathShark™ is not equipped with a method for learning the process of mental computation along with a visual display of graphic images. After a short while a child using this calculator becomes uninterested in performing the "desiccated" exercises and moves on to more interesting activities. The MathShark™ Guide for Teachers and Parents on page 2 states that the product enables students "to sharpen their mental math skills—math performed mentally rather than on paper—from memorization to estimation to mental computation." Thus, MathShark™ is a tool only to compute and practice computation skills using flash cards. MathShark™ fails to teach the fundamental logical steps required in mental computation using the four basic arithmetical operations.

Another learning tool, called the Leapster™, displays in a big display screen colorful presentations of math problems, including math problems in a "flash card" form. A visual representation of a bunny is seen hopping from the river bank and to and from a log in an effort to make the user choose the correct answer from the answers displayed on the log. This tool is more interesting to children, but it provides only a drill in a flashcard form for children and some visual entertainment. Leapster™ fails to teach the fundamental logical steps required in mental computation using the four basic arithmetical operations. Leapster™ is a tool for practicing by presumption, not by understanding and learning the logical method of number manipulation.

There is an unmet need for an electronic calculating device having a graphic display and a method for teaching the four basic arithmetical operations to young children in order to teach children the fundamentals of mental computation at a young age by utilizing their near-instinctive understanding of the four basic operations. There is an unmet need for a basic primary math instruction calculator that provides visual, aural, and/or tactile stimuli as the child uses the calculator to learn, to comprehend the meaning of and to solve math problems.

SUMMARY OF THE INVENTION

In one aspect, there is provided a method for teaching arithmetic using an electronic calculating device having a display and input means, the method comprising: receiving, via the input means, user input indicative of first and second operands and an arithmetical operation to be performed upon the operands, the operation being one of addition, subtraction, multiplication and division; displaying upon the display the first number N1 and operand as a first set collection of icons whose number is equal to the first operand; displaying upon the display the second operand as a second set collection of icons whose number is equal to the second operand;

displaying upon the display a grid for facilitating visualization of an answer to the arithmetical operation in a base ten format, the grid comprising multiple rows or columns of ten cells each to represent the base ten format, each occupied cell representing a unit of the computed answer, the cells initially being unoccupied; using the icons of the first and second collections, occupying cells within the display grid with icons to visually represent the answer, each of the cells being occupied by at most one icon, the occupying resulting in a total number of icons within the grid that is equal to the computed answer; wherein the occupying comprises regrouping the icons from the second collection into two groups, the first and second groups occupying adjacent rows or columns respectively of the grid in order to provide a visualization of arithmetic carry-over.

In another aspect, there is further provided a method for teaching arithmetic on an electronic calculating device, having input means and a display, comprising the steps of: receiving, via the input means, a selection of first and second operands and of an arithmetical operation to be performed upon the first and second operands, the arithmetical operation being addition; displaying upon the display the first number operand as a first collection of icons whose number is equal to the first operand; displaying upon the display the second operand as a second collection of icons whose number is equal to the second operand; displaying upon the display a grid for facilitating visualization of an answer to the arithmetical operation in a base ten format, the grid comprising multiple rows or columns of ten cells each to represent the base ten format, each occupied cell representing a unit of the computed answer, the cells initially being unoccupied; moving the icons of the first collection to occupy cells of the grid, each icon occupying a single cell, the occupying being performed row by row or column by column and resulting in one row or column respectively being only partially occupied by icons, the number of occupied cells in the partially occupied row or column being equal to the ones place value of the first operand; regrouping the icons of the second collection into two groups, the first group containing a number of icons equal to the number of unoccupied cells in the partially occupied row or column, the second group containing the remaining icons of the second collection; moving the icons of the first group to the unoccupied cells of the partially occupied row or column so as to create a fully occupied row or column, each icon of the first group occupying a single cell; and moving the icons of the second group to partially occupy the next row or column, each icon of the second group occupying a single cell, wherein the moving of the icons of the second group provides a visualization of arithmetic carry-over.

In yet another aspect there is provided a method of teaching arithmetic using an electronic calculating device comprising input means and a display, the method comprising: receiving, via the input means, user input indicative of first and second operands and of an arithmetical operation to be performed upon the first and second operands, the arithmetical operation being subtraction, the first operand being a minuend greater than ten, the second operand being a subtrahend that, when subtracted from the minuend, will result in a difference that is a positive number less than ten; displaying upon the display the minuend as a collection of icons whose number is equal to the minuend; displaying upon the display a grid for facilitating visualization of an answer to the arithmetical operation in a base ten format, the grid comprising multiple rows or columns of ten cells each to represent the base ten format, the cells initially being unoccupied; moving the icons of the collection to occupy cells within the grid, each icon occupying a single cell, the occupying being performed row by row or column by column and resulting in at least one row or column respectively being completely occupied by icons and exactly one row or column being only partially occupied by icons, wherein the number of occupied cells in the partially occupied row or column is equal to the ones place value of the minuend; changing an appearance of a subset of the icons within the grid in order to represent the subtrahend, the number of icons in the subset being equal to the subtrahend, the subset including the icons of the partially occupied row or column and one or more icons of an adjacent row or column, so as to provide a visualization of arithmetic carry-over.

In yet another aspect, there is provided an electronic calculating device for use in teaching arithmetic, the device comprising: input means; a display; a central processing unit; and memory storing software that, upon execution by the central processing unit, causes the device to: receive, via the input means, user input indicative of first and second operands and an arithmetical operation to be performed upon the operands, the operation being one of addition, subtraction, multiplication and division; display upon the display the first operand as a first collection of icons whose number is equal to the first operand; display upon the display the second operand as a second collection of icons whose number is equal to the second operand; display upon the display a grid for facilitating visualization of an answer to the arithmetical operation in a base ten format, the grid being made up of multiple rows or columns of ten cells each to represent the base ten format, each occupied cell representing a unit of the computed answer, the cells initially being unoccupied; using the icons of the first and second collections, occupying cells within the display grid with icons to visually represent the answer, each of the cells being occupied by at most one icon, the occupying resulting in a total number of icons within the grid that is equal to the computed answer, wherein the occupying comprises regrouping the icons from the second collection into two groups, the first and second groups occupying adjacent rows or columns respectively of the grid in order to provide a visualization of arithmetic carry-over.

The present method is embodied in an electronic calculating device that is programmed to assist a user in learning basic arithmetical calculations, i.e. addition, subtraction, multiplication and division. The calculating device typically comprises a display, input means (e.g. a set of buttons), an electrical power source (e.g. a battery and/or a solar cell) or means for connecting to an electrical power source, a central processing unit (CPU), memory, logic circuits and software. The calculating device may further comprise a chip or chips for permitting remote control of the device by a teacher in a classroom setting. The calculating device may be an individual hand-held device or a larger device, for example a large device with overhead projecting capability. The components and construction of electronic calculating devices are well known to one skilled in the art. The display in a calculating device useful for the method of the present invention is typically larger than displays on standard calculators to accommodate the proper display of the collections of individual icons, the numbers associated with the icons and the tables or grids that contain the icons and the numbers.

The method is primarily directed to users 4.5 years old and older, particularly from 4.5 years old to 8 years old. The method comprises a sequence of steps in which the user enters data and data is displayed graphically on the display of the calculating device. Learning of the basic arithmetical calculations is assisted by the way in which data is displayed on the calculating device. There are a number of visual, auditory and tactile display features that assist in learning.

Numerical data entered and displayed during an arithmetical calculation is represented by base ten numbers. In the present method, base ten numbers may be represented by collections of individual icons, one icon for each unit of 1 in the number. For example, the number 14 would be represented by fourteen individual icons. Representing numbers as individual icons provides a visual measure of the number to the user and permits certain visual manipulations of the number to assist in teaching the basic arithmetical calculations.

In performing an arithmetical operation, collections of individual icons associated with two or more operands (e.g. the first and second numbers) are regrouped by the calculating device into another collection of individual icons displayed in sets of ten, with single icons forming any remaining partial set of ten, to represent an answer. Whether there are two, three, four or more operands and associated collections of individual icons, the method works in essentially the same way. Regrouping of the icons is performed visually on the display to illustrate how the arithmetical operation functions and to simulate the mental computations and logical manipulation of numbers required to arrive at the answer, given the particular arithmetical operation and operands. Thus, the calculating device provides a visual rendering of the mental steps and the logical number manipulation required to solve an arithmetical problem, including the important steps of regrouping and carry-over. For multiplication and/or division, another regrouping may be performed to form yet another collection of individual icons in which the icons are displayed in a number of groups equal to the value of one of the operands. Thus, the idea of multiples and dividends may be transmitted to the user.

Regrouping of icons may be displayed as an animation showing the individual icons moving on the display, for example jumping, being carried, etc., to form collections of icons. The icons may also show changes in attitude, for example, changes in facial expression such as blinking, smiling and the like. Noticeable pauses between the movements of certain icons may be used to emphasize particular mental steps in the arithmetical problem, for example pauses between sets of ten icons and/or between groups of icons having a number of individual icons equal to one of the operands. Icons may be moved in groups or individually to emphasize certain mental computation steps.

Movement of the icons may be accompanied by sound effects, for example musical notes, animal sounds, etc. Use of sound effects permits some cross-curricular learning, which is emphasized in the curriculum. Animal sounds, for example a bird song, frogs croaking, etc., can be used to reinforce a science curriculum. Musical notes, particularly melodic sequences, can be used to reinforce a music curriculum. Musical notes are preferably sensible and recognizable musical phrases, bars selected from known musical pieces, for example soft classical music pieces like Tchaikovsky's Act II #14 from the Nutcracker (Dance of the Sugar Plum Fairy), Beethoven's Turkish March, etc. Dance music is particularly preferred as it may be used to reinforce the physical education curriculum by acquainting the user with common dance melodies. Research indicates that children exposed to classical music have higher intelligence. The use of classical music in the calculating device may bring to the attention of parents, guardians and teachers the benefits of classical music and may provide a soft musical background whilst the calculating device is used.

Individual icons may be any symbol, picture, or other visual representation. Each individual icon may be the same or different. Individual icons in one collection of icons may be the same or different from those in another collection of icons. Preferably, individual icons represent living organisms, for example insects, frogs, birds, etc, which may help reinforce a science curriculum by sensitizing the user to the appearance of various kinds of living organisms. The individual icons may be changed randomly from level to level, or even from problem to problem within a level, in order to more thoroughly engage the user by providing visual variation. In one embodiment, the visual representation of the individual icons may match the sound effects when the icons move on the display (e.g. if the icons are blue jays, the sounds are blue jay song). The icons may be colored to provide more visual stimulation. Further, icons in different collections may be colored differently to emphasize the separateness of the collections. Furthermore, icons may change color at key points of the method to emphasize certain mental computation steps required to solve the arithmetical problem. Yet further, after the movement of icons, silhouettes of the icons may remain in the place from which they moved to provide a convenient back reference for the user.

As previously indicated, the individual icons are associated with numbers in the display. Movement and/or color changes of the icons may be accompanied by a change in tone and/or size of the numbers associated with the icons to further emphasize the mental steps. Thus, numbers may change from bold to faded tones, or vice-versa, or from a small size to a large size, or vice-versa, when the icons undergo movement or change.

An animated character may appear on the display to point to significant features of the display thereby drawing the user's attention to that feature. The animated character may also prompt the user to enter data. The animated character engages the user and helps keep the user focussed on the task. The animated character may be designed to enhance the entertainment value of the method thereby further engaging the interest of the user. For example, the animated character may be an interesting character such as an animal, e.g. a frog, and may undergo various bodily contortions such as arm and leg movements, eye movements (e.g. blinking and winking), mouth movements (e.g. smiling, croaking and frowning), etc. The color of the animated character may also be changed to provide more visual stimulation.

Preferably, the method has four modules corresponding to the four arithmetical operations, i.e. addition, subtraction, multiplication and division, although it is possible for the method and calculating device to be solely dedicated to one, two or three of the arithmetical operations. When the calculating device is initially turned on, the user may be prompted to choose a module. Choosing a module may be effected by inputting the correct command, for example by pressing a button labeled with "+", "−", "×" or "÷".

Within each module, there is a learning mode that encompasses the method. Each module preferably also comprises a practice mode and a testing mode in which the user may practice what is learned and be tested on what is learned. The practice and testing modes provide progressively less assistance to the user in solving the arithmetical problems. Much of the animation found in the learning mode is not present in the practice and testing modes. In the learning, practice and/or testing modes, especially the testing mode, the electronic calculating device may provide an indication of whether an answer inputted by the user is correct or incorrect.

Within each module, there may also be levels of difficulty that teach how to solve progressively more difficult problems. Thus, each of the four modules preferably has several levels of difficulty. The level of difficulty may be chosen by the user after choosing the module.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
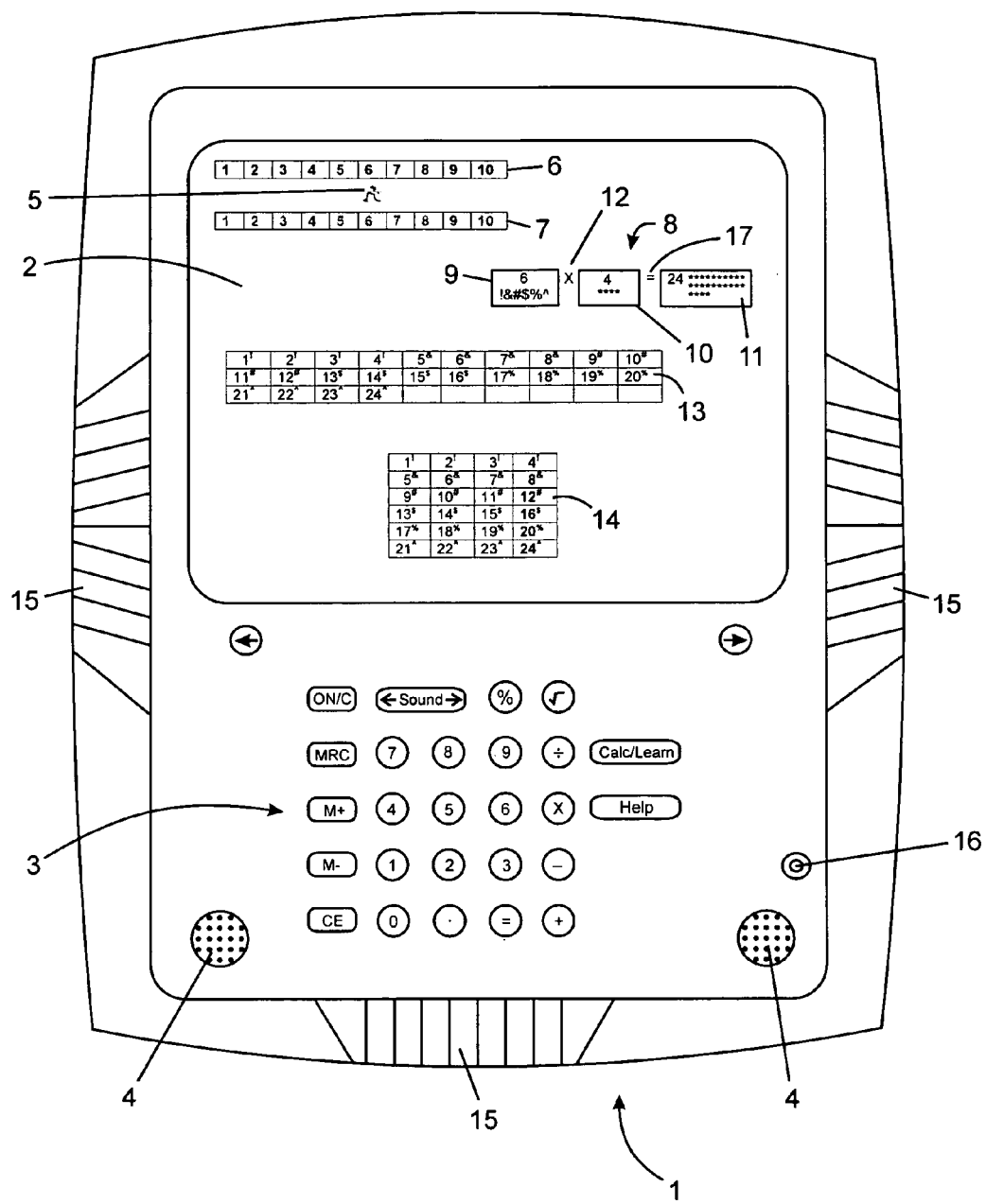
FIG. 1 is a schematic drawing of an electronic calculating device on which a method of the present invention may be performed.

Referring to FIG. 1, electronic calculating device 1 comprises an LED or LCD display screen 2 for displaying data and a set of buttons 3 for inputting commands. The buttons provide numerical inputs from 0 to 9 and inputs for arithmetical operators, i.e. addition, subtraction, multiplication, division and equality. Numerical inputs for numbers having more than one digit may be done by pressing two or more numerical buttons sequentially. An ON/C button switches power on and off and may be used to clear all entries. A Sound button switches sound on and off and controls the sound volume. When the sound is on, sounds emanate from speakers 4 and/or from a headset plugged into jack 16. A Calc/Learn button switches the calculating device between a teaching mode that embodies the method of the present invention and a regular calculator mode. A → button and a ← button are used to toggle forward and backward, respectively, between levels of difficulty in the teaching mode or between learning, practice and testing modes within the teaching mode. A Help button toggles back from the testing mode to the learning mode, and may be programmed to provide the correct answer when pressed twice in rapid succession. The calculating device may also comprise other standard buttons found on electronic calculators, for example memory buttons MRC, M– and M+, a clear entry button CE, and a decimal point button ., a square root button √, and a percent button %. The calculating device may also comprise rubber handles 15 to make the device easier to hold.

Still referring to FIG. 1, displayed on the display screen in the teaching mode, animated character 5 depicting a frog called Zaba MathCroak, Zaba for short, assists in prompting a user to enter inputs into the device. Zaba may be depicted wearing a T-shirt with his name Zaba printed on the front and MathCroak printed on the back. Zaba may assume a variety of poses, for example standing or squatting. Animation of Zaba assists in focussing the attention of the user on a specific step in the method. For example, Zaba may point, croak, move, jump, smile, frown or perform any other movement in an attempt to attract the user's attention to a specific aspect of the method.

In FIG. 1, the display further comprises first list of numbers 6, second list of numbers 7 and fact table 8. Fact table 8 contains a first collection of individual icons 9 associated with a first number (operand), i.e. the number 6, selected from the first list as indicated by animated character 5. The total number of icons in the first collection is 6. The icons in the first collection are the symbols !, &, #, $, % and ^ representing 6 different colors. Fact table 8 also contains a second collection of individual icons 10 associated with a second number (operand), i.e. the number 4, selected from the second list as indicated in bold. The total number of icons in the second collection is 4, and each icon is the symbol *. The second number may be selected by the user or may be selected automatically based on difficulty level desired. Fact table 8 also contains answer 11, which is the number 24 in this case, together with a collection of twenty-four individual icons. Fact table 8 also contains the arithmetical operation 12, which is multiplication in this case, and equality sign 17. Once the individual icons in fact table 8 have moved to a display grid, described below, the icons in the fact table in 9 and 10 may remain only as silhouettes.

Still referring to FIG. 1, in this embodiment the display further comprises a third collection of individual icons 13 in a display grid containing icons grouped in sets of ten, the total number of icons being equal to the answer. Each icon in the third collection is associated with a number from 1 to the answer, i.e. the number 24. Individual icons from the second collection have been regrouped and each icon from the second collection is repeated six times sequentially to reflect the influence of the first number in the arithmetical operation, i.e. multiplication. Thus, multiplication is represented as adding the same number together (e.g. 4) for a certain number of times (e.g. 6) times. Having six different colors for each group of four icons serves to visually highlight this idea.

Still referring to FIG. 1, the display also comprises a fourth collection of individual icons 14 in which the third collection of icons has been regrouped into a display grid containing six groups of four icons to more clearly illustrate the nature of multiplication, as well as to illustrate counting by four. Each icon is associated with a number from 1 to 24 in the display grid.

The fact table and the display grids containing the third and fourth collections of individual icons are displayed in horizontal forms in FIG. 1. They could also be displayed in vertical forms. When displayed in horizontal form, it is preferred that the numbers increase sequentially from left to right. When displayed in vertical form, the numbers may increase sequentially from bottom to top. The columns and/or rows in the display grids may be attached as shown in FIG. 1, or spaced apart if desired.

It should be noted that while color is not depicted in the Figures, the use of different colors associated with groups of individual icons and the use of color changes as the icons move between tables and grids can serve to further visually distinguish the various important mental steps in performing the arithmetical operations. This enhances visualization of the logical sequence required in an arithmetical operation.

When the calculating device is first turned on, the device is automatically in teaching mode. The teaching mode of the electronic device is directed to teaching addition, subtraction, multiplication and division to primary school children, in particular children that are from 4.5 to 8 years old. The teaching mode has four modules corresponding to the four arithmetical operations of addition, subtraction, multiplication and division. Each module has a plurality of levels of difficulty. The user is first prompted to select a module, i.e. an arithmetical operation, which can be selected by pressing the appropriate button corresponding to the arithmetical operation. The user starts at the first level of difficulty, but may skip levels using the Next button. The user starts in learning mode, but may skip learning mode in favor of practice mode or testing mode by using the Next button. The Help button returns the user to learning mode for the particular module and level of difficulty in which the user is currently working.

Each module and level of difficulty in the teaching mode has a learning mode, and may have a practice mode and a testing mode. Each of the learning, practice and testing modes may present any number of problems for the user to learn from, practice on or be tested on. Preferably, some problems are presented in horizontal form and some in vertical from. Preferably, there are 10 problems per mode per level of difficulty. For example the learning mode of addition at difficulty level 3 may have 10 problems. On a problem to problem basis, the calculating device may be programmed to randomly determine in which form to display the problems, i.e. horizontally or vertically.

The method preferably provides instant feed back to the user. Zaba may exhibit a happy face to indicate a correct answer after each problem. A green light may flash and/or happy sounds may be emitted to indicate a correct answer after each problem. If the answer is incorrect, a red light may flash, unhappy sounds may be emitted and/or Zaba may exhibit an unhappy face. At the end of learning, practice and/or testing exercises the Zaba may be displayed holding a score board, for example 9/10 of which 10 is the total number of problems presented and 9 is the number of correct answers entered by the user.

Both, each module and level of difficulty within a module have certain similarities and differences. With reference to FIGS. 2-15, modules and levels of difficulty are now described for the learning modes of the described modules and levels of difficulty.

Addition Module:

There are six levels of difficulty in the addition module as follows, all six of which are described below:

adding two one-digit addends, or one one-digit addend and 10 to a sum less than/or equal to 10;
adding two one-digit addends to add to a sum of 10;
adding 10 and a one-digit addend to add to a sum from 10-20;
adding two one-digit addends to add to a sum from 10-20;
adding one two-digit addend and 100 and one one-digit addend to a sum from 10-100; and,
adding two two-digit addends to add to a sum less than/or 100.

Addition—Difficulty Level 1: Adding Two One-Digit Addends, or One One-Digit Addend and 10 to a Sum Less than/or Equal to 10.

Figure 2:
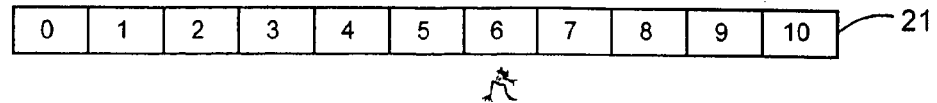
FIG. 2 is a schematic drawing of a display for learning addition at a first level of difficulty.
Figure 2:
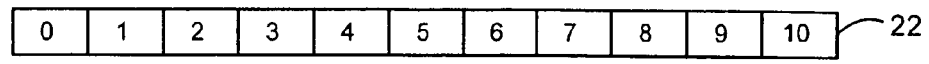
Figure 2:
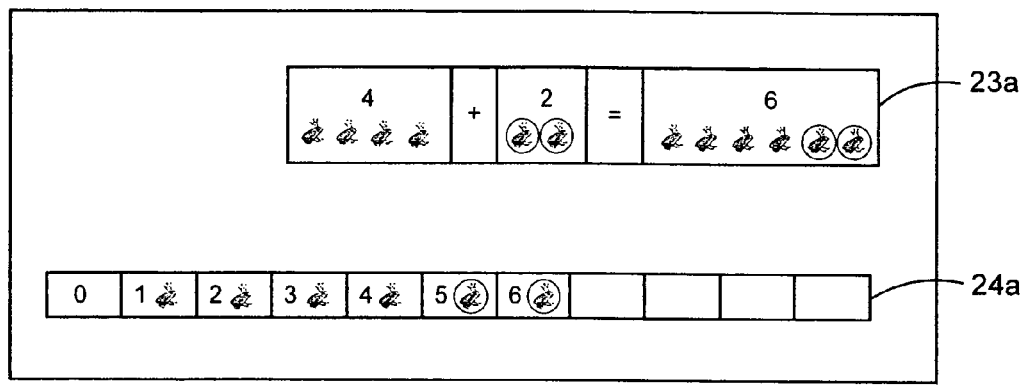
Figure 2:
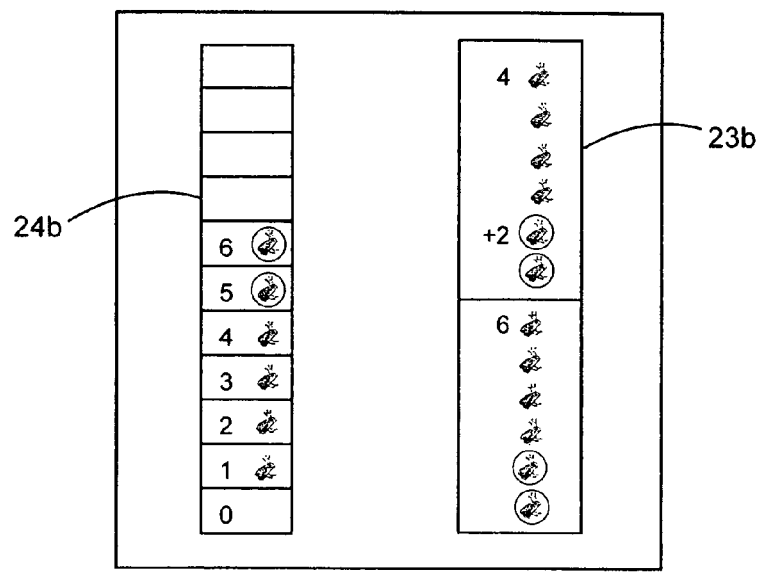

Referring to FIG. 2, a display for learning addition at difficulty level 1 is shown in the learning mode. Zaba, the animated character is displayed peeking/looking over a horizontally oriented first list of addends 21 prompting the user to select a number from 0-10 from the first list of addends. The user selects the first addend, e.g. the number 4, by pressing the appropriately numbered button on the calculating device. After the user chooses a first addend, a horizontally oriented second list of addends 22 is displayed and the user is prompted by Zaba to select a second number from 0-10 from the second list of addends. The device automatically prevents choices of the second addend which would result in the addition problem being outside the difficulty level. Which selections for second addend are prevented depends on the first addend selected by the user. For example if the first addend is 4 then the device will display 0, 1, 2, 3, 4, 5, 6, to choose from for the second addend, with the number 7, 8, 9 and 10 displayed in faded tones. Zaba also helps prompt the selection of the second addend by peeking/looking over the second list of addends. Zaba remains on the display to help and watch the learning process.

The device displays an addition fact table 23a or 23b, either horizontally 23a or vertically 23b. The addition fact table contains: the first addend, e.g. the number 4, displayed together with four individual frog icons; the second added, e.g. the number 2, together with two individual frog icons having a different color than the ones with the first addend; a "+" sign between the first and second addends; an "=" sign or an underline after the second added; all followed by an answer (sum), e.g. the number 6, together with six individual frog icons. In FIG. 2, the color difference in the frog icons is represented by a circle around the icon.

The device regroups the individual icons from the addition fact table into an addition display grid 24a or 24b, either horizontally 24a or vertically 24b. The addition display grid displays the icons in sets of ten. There is one row or column having boxes containing numbers from 0-10 (first base ten). There is one number per box and one icon per number. No icon is displayed for the number 0.

In more detail with reference to FIG. 2, the method for addition at difficulty level 1 is described as follows.

The calculating device is turned ON and Addition Level 1 is selected by the user. The calculating device displays the first list of addends 21 with Zaba looking over and prompting the user to select a first addend. The user selects addend 4 by pressing the button labeled with the number 4 on the calculating device. The calculating device displays the addend 4 in the first or top box of the addition fact table 23a or 23b. One second later the calculating device displays four green frogs associated with the first addend. At the same time the calculating device hides the first list of addends and leaves Zaba to help with the process of solving the addition problem. The calculating device moves Zaba close to the first addend in the addition fact table to look at the four frogs along with number 4, and then moves to the place where the "+" sign is displayed in faded tones to prompt the user to press the button on the calculating device labeled with the "+" sign. Zaba moves within a 1 or 2 second time frame on the display screen and exhibits some animation, e.g. eye, limb and/or finger movement.

The user presses the "+" button and the calculating device displays the "+" sign in brighter tones. The numbers 0-4 are displayed in the addition display grid 24a or 24b. One second later Zaba points to the frogs associated with the first addend in the addition fact table and the frogs move from the addition fact table to the addition display grid to take their places with the numbers 1-4. With sound ON, the calculating device emits music as the frogs move to take their places in the addition display grid. The music is a sensible and recognizable musical phrase or collection of bars that starts when the frogs begin moving and ends when the frogs stop moving. The calculating device does not display a frog together with the number 0. The four frogs associated with addend 4 in the addition fact table remain in the addition fact table as faded silhouettes for reference by the user if required.

The calculating device displays the second list of addends 22 in which the permissible selections 0, 1, 2, 3, 4, 5, and 6 are displayed in darker tones than the impermissible selections 7, 8, 9 and 10. Zaba prompts the user to select a second addend by pointing to the numbers 0, 1, 2, 3, 4, 5, and 6. The user selects the second addend, e.g. the number 2, by pressing the appropriate button on the calculating device. The second addend, e.g. the number 2, is then displayed in the addition fact table 23a or 23b and the second list of addends is hidden by the calculating device. One second later two purple frogs are displayed associated with the second addend in the addition fact table. After another one second, the two purple frogs move to the addition display grid 24a or 24b in a manner similar to the one described for the first addend to take their places along with the numbers 5 and 6 (first base ten). Music is played while the frogs move in a similar manner as described above. The two frogs associated with addend 2 in the addition fact table remain in the addition fact table as faded silhouettes for reference by the user if required.

Zaba moves to the place where the "=" sign or the underline is displayed in faded tones in the addition fact table 23a or 23b to prompt the user to press the button on the calculating device labeled with the "=" sign. The user presses the "=" button on the calculating device, the "=" sign or the underline is displayed in bold tones and one second later the answer, e.g. the number 6, appears enlarged and flashing in the addition display grid 24a or 24b. Zaba moves closer to the answer and with animation prompts the user to press the button labeled with the number 6. The user presses the button labeled 6 and the answer in the addition fact table is displayed in a different tone, size and/or color. Then, with the assistance of Zaba, the six frogs in the addition display grid are moved to the addition fact table to be associated with the answer. Music is played as the frogs move. The music forms a continuous piece as the six frogs move. The addition display grid is closed.

At difficulty level 1, some examples of addition problems that may be presented either in horizontal or vertical form are 2+4, 3+4, 4+4, 5+4, 6+4, 7+1, 8+0, 9+1, 3+0, 4+1, 5+2, 6+1, 7+0, 8+1, etc.

Addition—Difficulty Level 2: Adding Two One-Digit Addends to Add to a Sum of 10.

Figure 3:
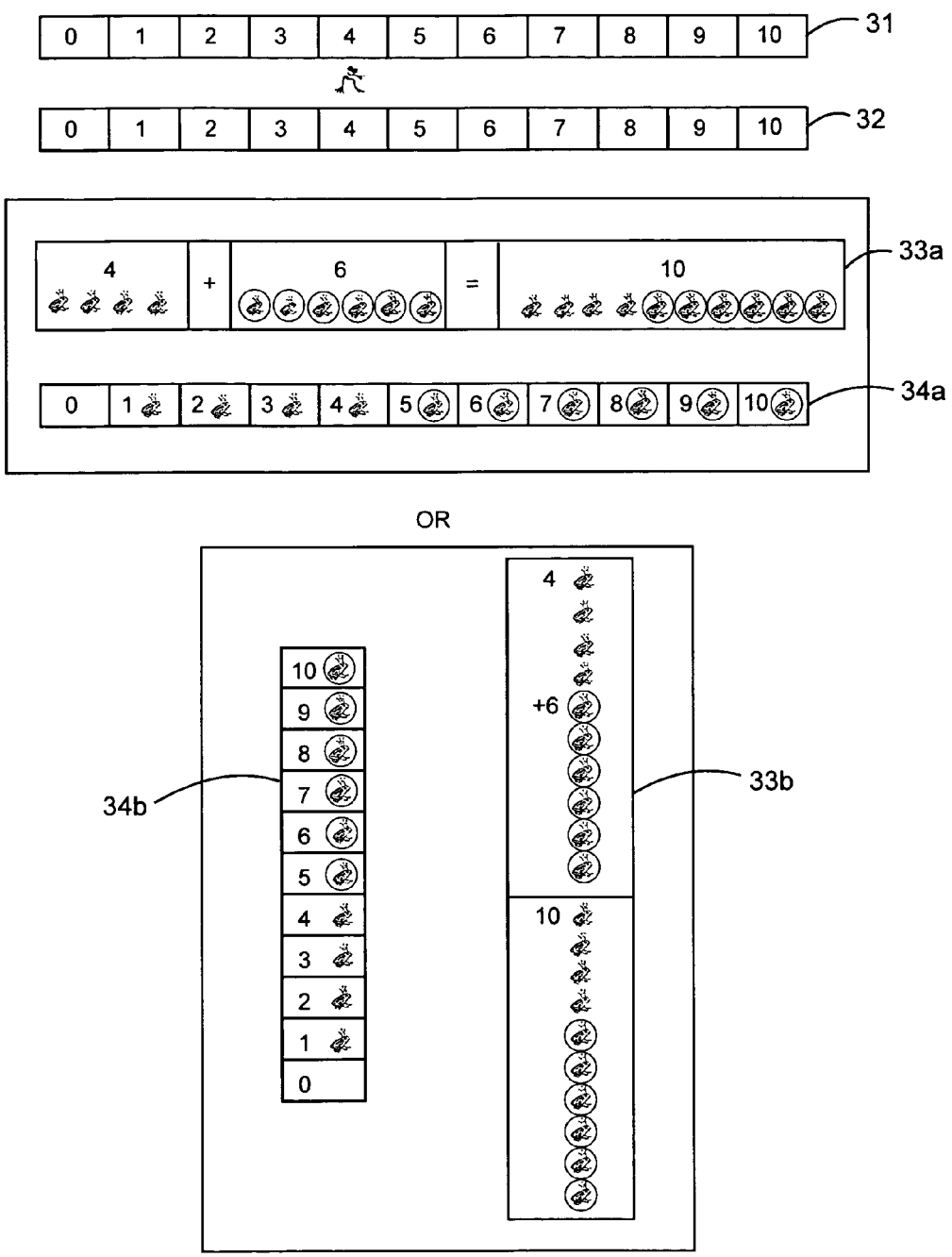
FIG. 3 is a schematic drawing of a display for learning addition at a second level of difficulty.

Referring to FIG. 3, a display for learning addition at difficulty level 2 is shown in the learning mode. In a manner similar to difficulty level 1, the display comprises a first list of addends 31, a second list of addends 32, a horizontal or vertical addition fact table 33a or 33b respectively, and a horizontal or vertical addition display grid 34a or 34b respectively.

Difficulty level 2 follows the same basic method as difficulty level 1 except that the choice of the second addend is restricted to a number that when added to the first addend results in a sum that equals 10. In FIG. 3, the first addend selected by the user is the number 4, therefore, the second addend must be the number 6.

At difficulty level 2, some examples of addition problems that may be presented either in horizontal or vertical form are 2+8, 3+7, 4+6, 5+5, 6+4, 7+3, 8+2, 9+1, 7+3, 6+4, 1+9, 0+10, 10+0, etc.

Addition—Difficulty Level 3: Adding 10 and a One-Digit Addend to Add to a Sum from 10-20.

Figure 4:
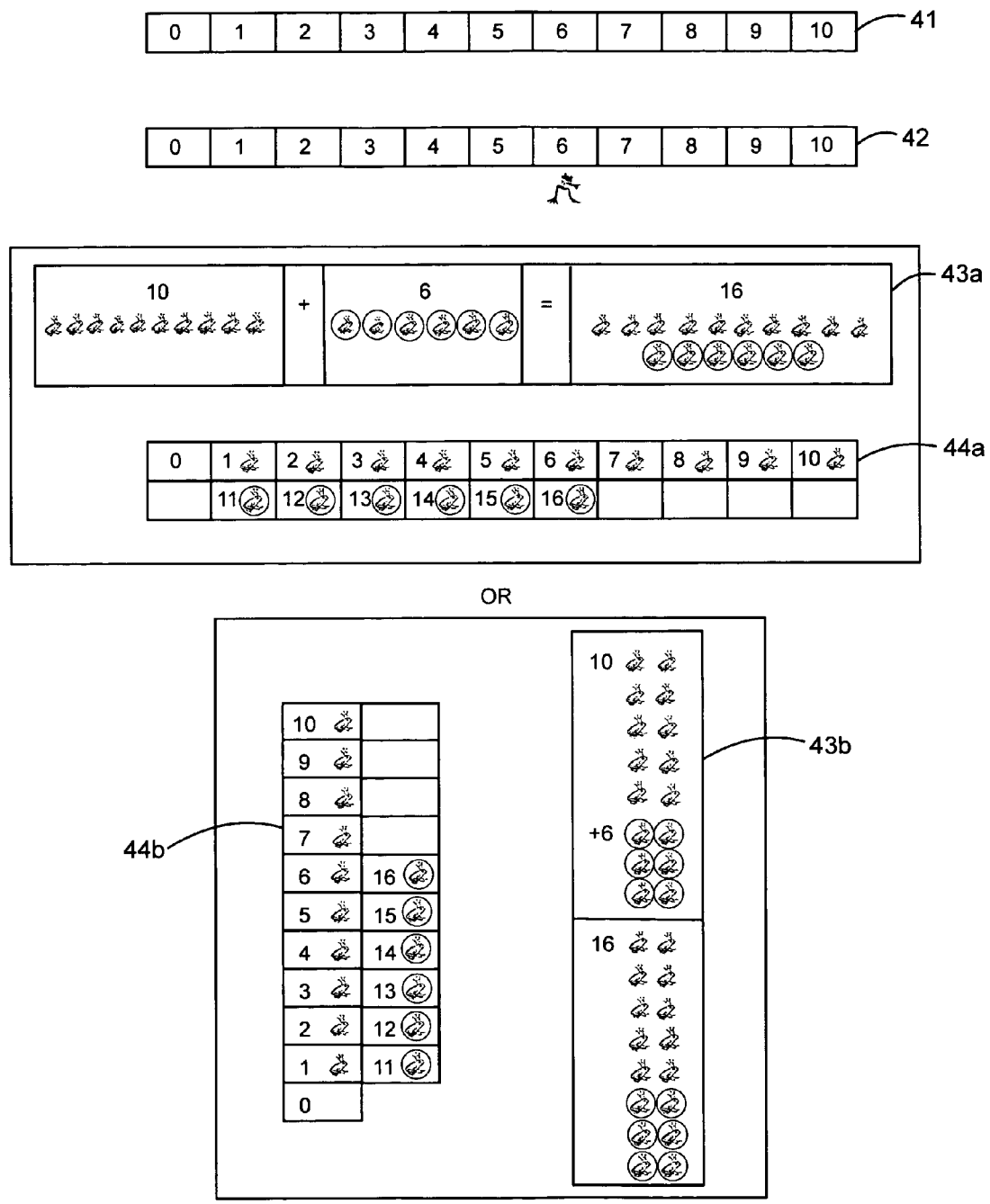
FIG. 4 is a schematic drawing of a display for learning addition at a third level of difficulty.

Referring to FIG. 4, a display for learning addition at difficulty level 3 is shown in the learning mode. In a manner similar to difficulty level 1, the display comprises a first list of addends 41, a second list of addends 42, a horizontal or vertical addition fact table 43a or 43b respectively, and a horizontal or vertical addition display grid 44a or 44b respectively.

Difficulty level 3 follows the same basic method as difficulty level 1 except that the choice of the first addend is restricted to 10. In FIG. 4, the first addend selected by the user is the number 10 and the second addend selected is the number 6. Since the answer in difficulty level 3 is a number from 10-20, the addition display grid, which displays icons in sets of ten, is two rows or columns instead of one row or column as displayed for difficulty level 1. The first row or column contains the numbers from 0-10 and forms the first base ten, and the second row or column contains the numbers from 11 to the answer and forms the second base ten. The numbers in the second row or column line up with the numbers in the first row or column such that 11 in the second row or column lines up with the 1 in the first row or column, 12 lines up with 2, 13 with 3, etc.

At difficulty level 3, some examples of addition problems that may be presented either in horizontal or vertical form are 10+8, 10+7, 10+6, 10+5, 10+4, 10+3, 10+2, etc.

Addition—Difficulty Level 4: Adding Two One-Digit Addends to Add to a Sum from 10-20.

Figure 5:
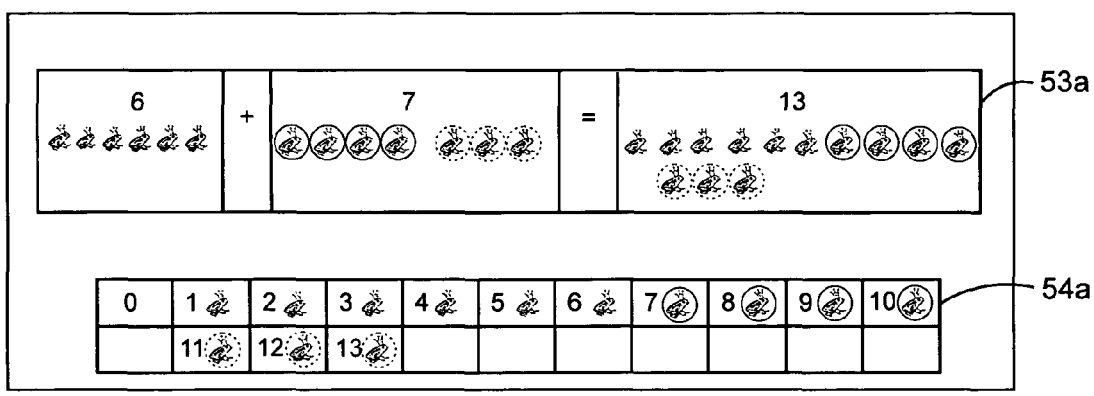
FIG. 5 is a schematic drawing of a display for learning addition at a fourth level of difficulty.
Figure 5:
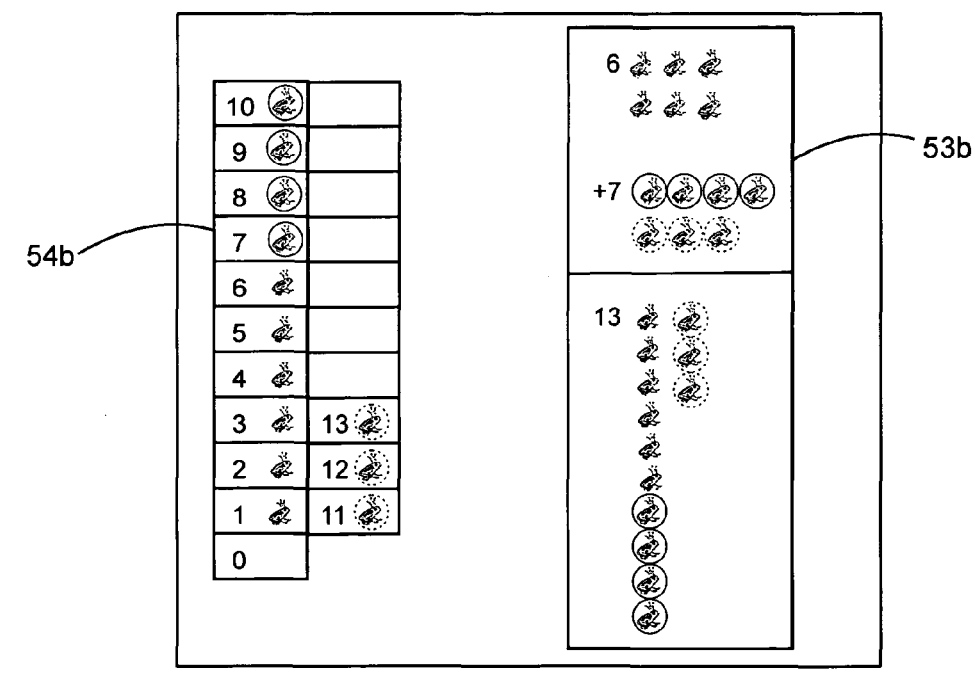

Referring to FIG. 5, a display for learning addition at difficulty level 4 is shown in the learning mode. In a manner similar to difficulty level 1, the display comprises a first list of addends 51, a second list of addends 52, a horizontal or vertical addition fact table 53a or 53b respectively, and a horizontal or vertical addition display grid 54a or 54b respectively.

Difficulty level 4 follows the same basic method as difficulty level 1 with a few differences. The choice of the first addend is restricted to the numbers 2-10. The choice of the second addend is restricted to the numbers 2-10 and to a number which when added to the first addend provides an answer from 10-20. In FIG. 5, the first addend selected by the user is the number 6 and the second addend selected is the number 7. Since the answer in difficulty level 4 is a number from 10-20, the addition display grid, which displays icons in sets of ten, is two rows or columns instead of one row or column as displayed for difficulty level 1. The first row or column contains the numbers from 0-10 and forms the first base ten, and the second row or column contains the numbers from 11 to the answer and forms the second base ten. The numbers in the second base ten. The numbers in the second row or column line up with the numbers in the first row or column such that 11 in the second row or column lines up with the 1 in the first row or column, 12 lines up with 2, 13 with 3, etc.

Further, since the two addends are one-digit numbers but the sum is a two-digit number, moving the icons into the addition display grid 54a or 54b requires splitting the individual icons associated with the second addend into two groups; one group accompanies the icons associated with the first addend to the first base ten and the other group forms numbers in the second base ten. Thus, prior to moving the individual icons associated with the second addend from the addition fact table 53a or 53b to the addition display grid 54a or 54b, the individual icons associated with the second addend are regrouped, with the help of Zaba separating numbers, and displayed as two groups in the addition fact table. The second group of icons is made into a different color to distinguish it from the first group. When the individual icons associated with the second addend are moved to the addition display grid, the first group moves in a jumping manner to populate the row or column forming the first base ten. The second group moves after the first group and is accompanied by a continuation of the musical selection that accompanied the first group. Furthermore, the second group does not move by jumping, but Zaba is displayed actually carrying the second group over to the addition display grid. Such an arrangement teaches the concept of "regrouping" and "carry over" in addition.

At difficulty level 4, some examples of addition problems that may be presented either in horizontal or vertical form are 2+9, 6+9, 3+8, 7+8, 5+7, 9+8, etc.

Addition—Difficulty Level 5: Adding One Two-Digit Addend and 100 and One One-Digit Addend to a Sum from 10-100.

Figure 6:
FIG. 6 is a schematic drawing of a display for learning addition at a fifth level of difficulty.

Referring to FIG. 6, a display for learning addition at difficulty level 5 is shown in the learning mode. In a manner similar to difficulty level 1, the display comprises a first list of addends 61, a second list of addends 62, a horizontal or vertical addition fact table 63*a* or 63*b* respectively, and a horizontal or vertical addition display grid 64*a* or 64*b* respectively. The display of icons in the vertical fact table 63*b* may be horizontal or vertical, but vertical is preferred.

Difficulty level 5 follows the same basic method as difficulty level 1 with a few differences. The first list of addends 61 comprises numbers from 10-100. Due to the large number of potential first addends, the first list of addends is displayed scrolling through the numbers from 10-100, with ten sequential numbers appearing in the display at any one time. Further, when choosing the first addend, the user is required to press a first button for the first numeral and a second button for the second numeral of the addend. Pressing the first button immediately limits the display of the first list of addends to the ten possible choices dictated by the choice of the first numeral. For example, pressing the numeral 1 as the first numeral of the first addend restricts the choice of the first addend to 10, 11, 12, 13, 14, 15, 16, 17, 18 and 19. In FIG. 6, the first addend selected by the user is the number 17 and the second addend selected is the number 8.

Since the answer is potentially any number from 10-100, the addition display grid 64*a* or 64*b* may have from 1-10 rows or columns depending on the answer. In FIG. 6, since the answer is 25, there are three rows or columns. The rows or columns are lined up in an analogous manner as described above for difficulty level 3. In addition, the choice of addends may potentially give rise to a regrouping and carry-over process as described above for difficulty level 4. The carry-over process follows the same basic method as described above for difficulty level 4. Individual icons are grouped in sets of 10 with single icons forming any remaining partial set of ten. Sets of ten icons move together accompanied by music with the single icons forming any partial sets moving individually accompanied by music.

At difficulty level 5, some examples of addition problems that may be presented either in horizontal or vertical form are 22+9, 30+9, 41+3, 57+2, 63+7, 77+5, 12+6, etc.

Addition—Difficulty Level 6: Adding Two Two-Digit Addends to Add to a Sum Less than/or 100.

Figure 7:
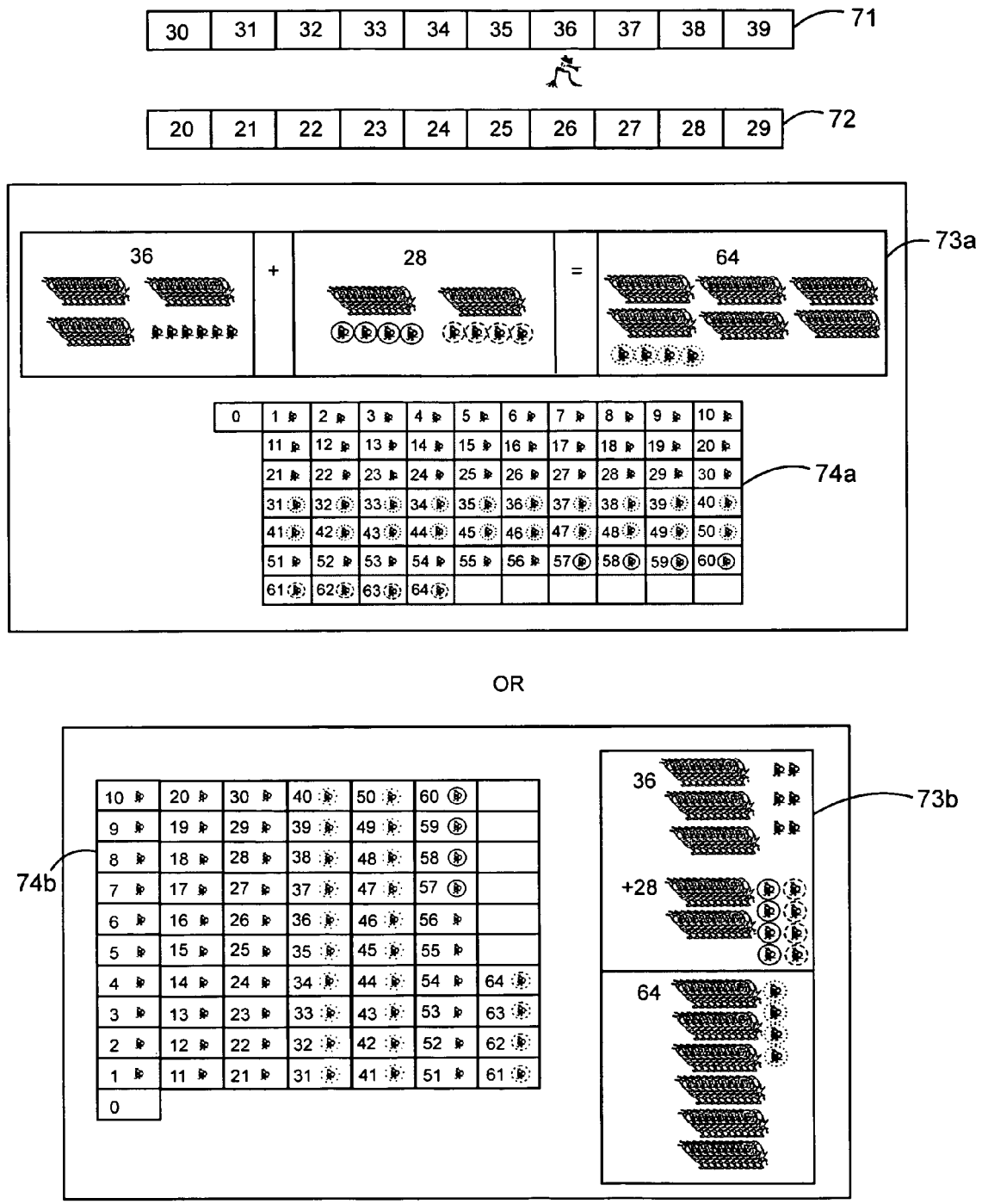
FIG. 7 is a schematic drawing of a display for learning addition at a sixth level of difficulty.

Referring to FIG. 7, a display for learning addition at difficulty level 6 is shown in the learning mode. In a manner similar to difficulty level 1, the display comprises a first list of addends 71, a second list of addends 72, a horizontal or vertical addition fact table 73*a* or 73*b* respectively, and a horizontal or vertical addition display grid 74*a* or 74*b* respectively.

Difficulty level 6 follows the same basic method as difficulty level 5 with a few differences. The first and second lists of addends, 71 and 72, comprise numbers from 10-90. Thus, due to the large number of potential first and second addends, both the first and second lists of addends are displayed scrolling through the numbers from 10-90 and the addends are chosen in a manner analogous to the first list of addends in difficulty level 5. Further, choice of the second addend is restricted to a number which when added to the first addend results in an answer less than or equal to 100.

In FIG. 7, the first addend selected by the user is the number 36 and the second addend selected is the number 28. The individual icons of the first and second addends are regrouped in the addition fact table 73*a* or 73*b* into groups of ten. For example, referring to FIG. 7, the individual icons of the first addend are grouped into three groups of ten and one group of six, while the individual icons of the second addend are grouped in two groups of ten and one group of eight. Movement of the individual icons of the first addend is effected by the icons jumping to the addition display grid to populate the grid sequentially. Icons are grouped in sets of ten, and each set of ten icons moves as one with single icons forming any remaining partial set of ten moving individually. Movement of the individual icons of the second addend occurs in three parts. Firstly, with the help of Zaba, all of the icons in the two groups of ten jump to the addition display grid and insert themselves between the third group of ten and the group of six icons of the first addend, thereby displacing the group of six from their positions at numbers 31-36 to positions at numbers 51-56 in the addition display grid. Secondly, the group of eight icons of the second addend is itself regrouped into two groups of four icons with the help of Zaba and one group of four icons jumps to the addition display grid to populate the grid at numbers 57-60. Thirdly, the last group of four icons of the second addend is carried over to the addition display grid by Zaba.

Thus, at difficulty level 6, the movement of icons teaches about regrouping and carrying-over, and simulates mental computation methods for adding two two-digit numbers by adding the tens and ones separately. Use of colored icons and changes in the color of the icons can more clearly illustrate this method of addition to the user as the user can more easily see how the icons are moving.

Due to the potentially large number of rows or columns for the addition display grid, the addition display grid may be displayed at reduced size to fit on the display screen of the calculating device.

At difficulty level 6, some examples of addition problems that may be presented either in horizontal or vertical form are 22+39, 30+45, 41+33, 57+21, etc.

Subtraction Module:

There are six levels of difficulty in the subtraction module as follows, all six of which are described below. Differences resulting in negative numbers are not permitted, subtracting two one-digit numbers and a one digit number from 10;

subtracting a subtrahend of 0-10 from a minuend of 10;

subtracting a subtrahend of 0-10 from a minuend of 10-20;

subtracting a subtrahend of 2-10 from a minuend of 11-20;

subtracting a subtrahend of 0-9 from a minuend of 10-100; and, subtracting a subtrahend of 10-100 from a minuend of 10-100.

Subtraction Level 1: Subtracting Two One-Digit Numbers and a One Digit number from 10.

Figure 8:
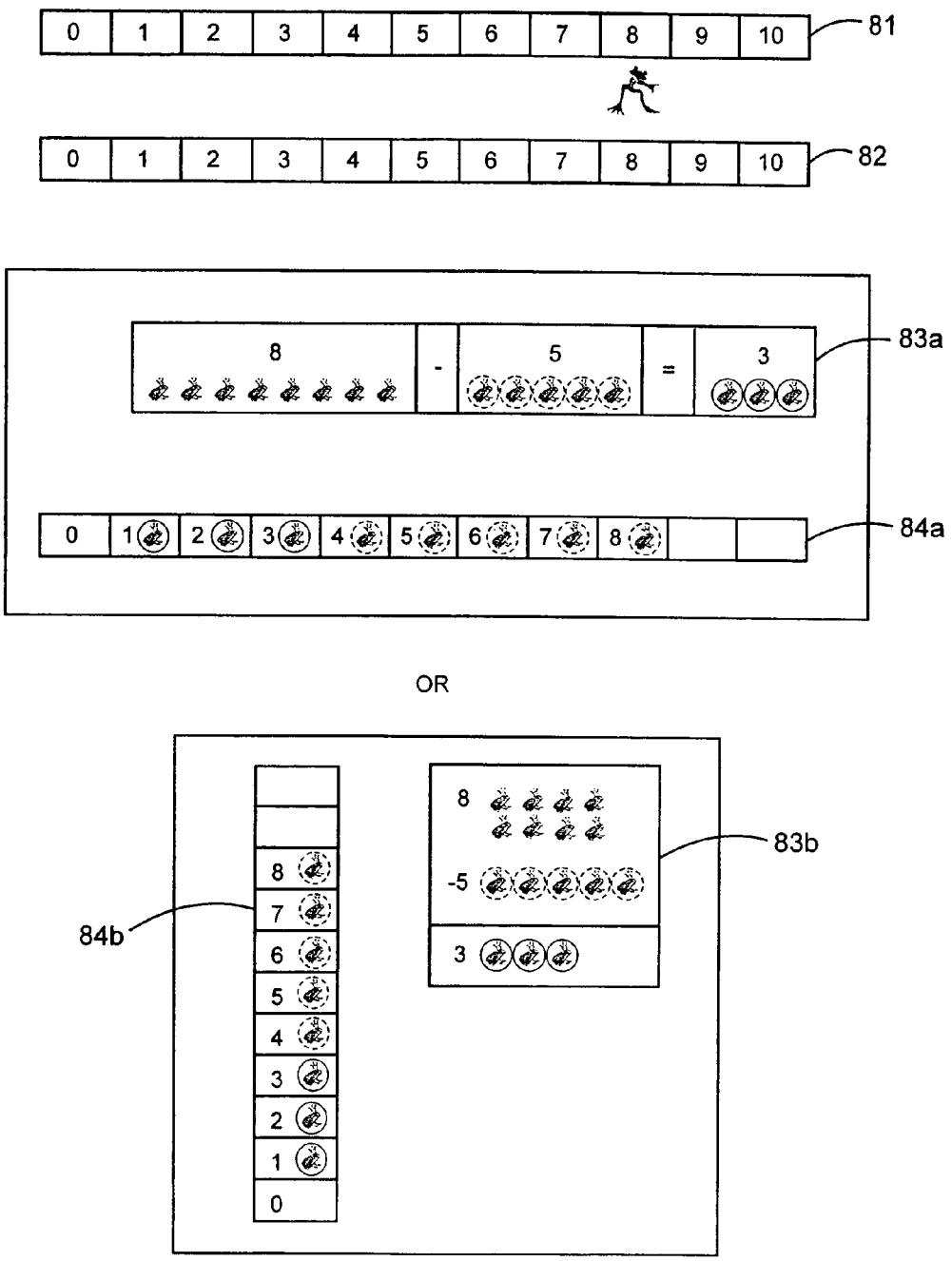
FIG. 8 is a schematic drawing of a display for learning subtraction at a first level of difficulty.

Referring to FIG. 8, a display for learning subtraction at difficulty level 1 is shown in the learning mode. Zaba, the animated character, is displayed peeking/looking over a horizontally oriented list of minuends 81 prompting the user to select a number from 0-9 from the list of minuends. The user selects the minuend, e.g. the number 8, by pressing the appropriately numbered button on the calculating device. After the user chooses a minuend, the horizontally oriented list of minuends 81 is closed and a horizontally oriented list of subtrahends 82 is displayed and the user is prompted by Zaba to select a second number from 0-9 from the list of subtrahends. The device automatically prevents choices of the subtrahend which would result in a negative difference. Which selections for subtrahend are prevented depends on the minuend selected by the user. For example if the minuend is 8 then the device will display 0, 1, 2, 3, 4, 5, 6, 7, 8 to choose from for the subtrahend, with the numbers 9 and 10 being displayed in faded tones. Zaba also helps prompt the selection of the subtrahend by peeking/looking over the list of permitted subtrahends. Zaba remains on the display to help and watch the learning process.

Once the minuend and subtrahend are chosen, the device displays a subtraction fact table 83*a* or 83*b*, either horizontally 83*a* or vertically 83*b*. The subtraction fact table contains: the minuend, e.g. the number 8, displayed together with eight individual frog icons; the subtrahend, e.g. the number 5, together with five individual frog icons having a different color than the ones with the minuend; a "−" sign between the minuend and subtrahend; an "=" sign or an underline after the subtrahend;

all followed by an answer (difference), e.g. the number 3, together with three individual frog icons. The icons in the vertical fact table 83*b* may be displayed horizontally or vertically, but vertically is preferred.

Once the subtraction fact table is displayed, the device regroups the individual icons from the subtraction fact table into a subtraction display grid 84*a* or 84*b*, either horizontally 84*a* or vertically 84*b*. The subtraction display grid displays the icons in sets of ten. There is one row or column having ten boxes (first base ten) containing numbers from 0-8 representing the minuend. There is one number per box and one icon per number. No icon is displayed for the number 0.

In more detail with reference to FIG. 8, the method for subtraction at difficulty level 1 is described as follows.

The calculating device is turned ON and Subtraction Level 1 is selected by the user. The calculating device displays the list of minuends 81 with Zaba looking over and prompting the user to select a minuend. The user selects minuend 8 by pressing the button labeled with the number 8 on the calculating device. The calculating device displays the minuend 8 in the subtraction fact table 83*a* or 83*b*. One second later the calculating device displays eight green frogs associated with the minuend. At the same time the calculating device hides the list of minuends and leaves Zaba to help with the process of solving the subtraction problem. The calculating device moves Zaba close to the minuend in the subtraction fact table to look at the eight frogs along with number 8, and then moves to the place where the "−" sign is displayed in faded tones to prompt the user to press the button on the calculating device labeled with the "−" sign. Zaba moves within a 1 or 2 second time frame on the display screen and exhibits some animation, e.g. eye, limb and/or finger movement.

The user presses the "−" button and the calculating device displays the "−" sign in brighter tones. The numbers 0-8 are displayed in the subtraction display grid 84*a* or 84*b*. One second later Zaba points to the frogs associated with the minuend in the subtraction fact table and the frogs move, with some animation, from the subtraction fact table to the subtraction display grid to take their places with the numbers 1-8. Faded silhouettes of the eight frogs are kept in the minuend box of the subtraction fact table for reference by the user if required. With sound ON, the calculating device emits music as the frogs move to take their places in the subtraction display grid. The music is a continuous, sensible and recognizable musical phrase or collection of bars that starts when the frogs begin moving and ends when the frogs stop moving. The calculating device does not display a frog together with the number 0.

The calculating device displays the list of subtrahends 82 in which the permissible selections 0, 1, 2, 3, 4, 5, 6, 7 and 8 are displayed in darker tones than the impermissible selection 9. Zaba prompts the user to select a subtrahend by pointing to the numbers 0, 1, 2, 3, 4, 5, 6, 7 and 8. The user selects the subtrahend, e.g. the number 5, by pressing the appropriate button on the calculating device. The subtrahend, e.g. the number 5, is then displayed in the subtraction fact table 83*a* or 83*b* and the list of subtrahends is hidden by the calculating device. One second later the five green frogs associated with the numbers 8, 7, 6, 5 and 4 of the minuend in the subtraction display grid 84*a* or 84*b* change color to purple and the numbers 8, 7, 6, 5 and 4 change from black to a faded tone. The color change in FIG. 8 is represented by circles around the frogs that changed color. The frogs and numbers change color and tone in sequence from 8 to 4. One second later, the five purple frogs move to the subtraction fact table 83*a* or 83*b* to be displayed in association with the subtrahend. Music is played while the five purple frogs move.

Zaba moves to the place where the "=" sign or the underline is displayed in faded tones in the subtraction fact table 83*a* or 83*b* to prompt the user to press the button on the calculating device labeled with the "=" sign. The user presses the "=" button on the calculating device, the "=" sign or the underline is displayed in bold tones and one second later the answer, e.g. the number 3, appears enlarged and flashing in the subtraction display grid 84*a* or 84*b*. Zaba moves closer to the answer and with animation prompts the user to press the button labeled with the number 3. The user presses the button labeled 3 and the answer in the subtraction fact table is displayed in a different tone, size and/or color. Then, with the assistance of Zaba, the three remaining frogs in the subtraction display grid are moved to the subtraction fact table to be associated with the answer. Music is played as the frogs move. The music forms a continuous piece as the frogs move. The subtraction display grid is closed.

At difficulty level 1, some examples of subtraction problems that may be presented either in horizontal or vertical form are 2−1, 4−0, 6−4, 7−5, 9−5, etc.

Subtraction—Difficulty Level 2: Subtracting a Subtrahend of 0-10 from a Minuend of 10.

Figure 9:
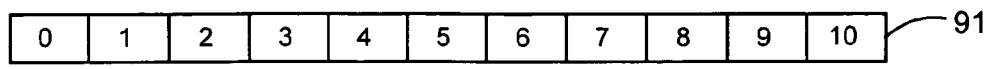
FIG. 9 is a schematic drawing of a display for learning subtraction at a second level of difficulty.
Figure 9:
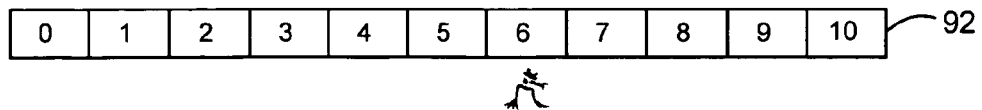
Figure 9:
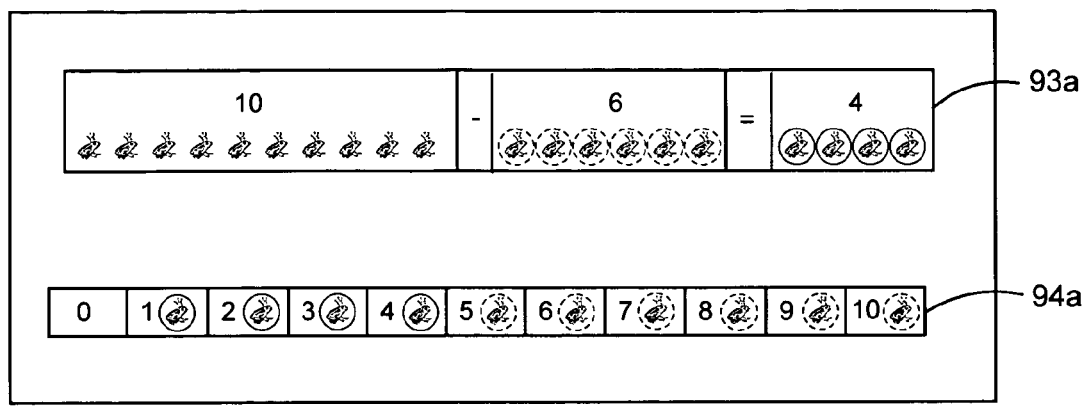
Figure 9:
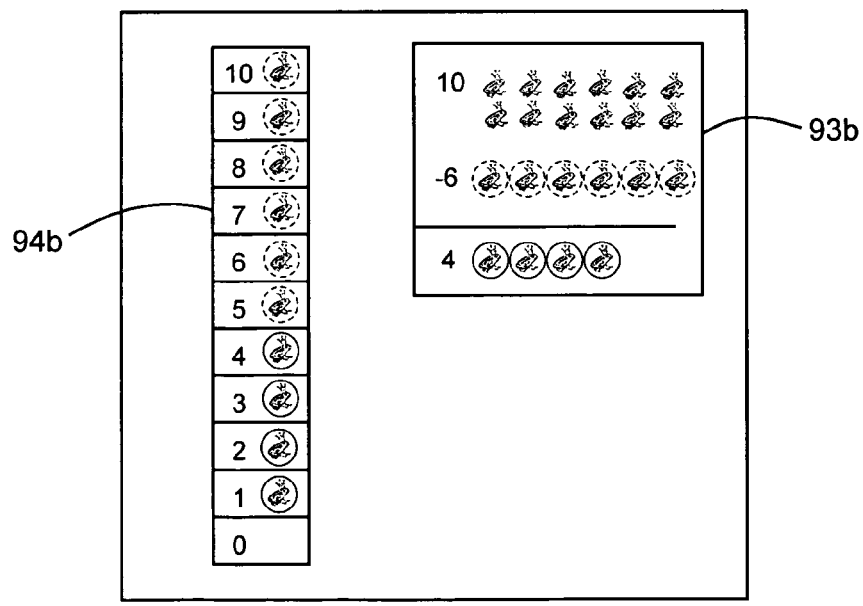

Referring to FIG. 9, a display for learning subtraction at difficulty level 2 is shown in the learning mode. In a manner similar to difficulty level 1, the display comprises a list of minuends 91, a list of subtrahends 92, a horizontal or vertical subtraction fact table 93*a* or 93*b* respectively, and a horizontal or vertical subtraction display grid 94*a* or 94*b* respectively.

Difficulty level 2 follows the same basic method as difficulty level 1 except that the choice of the minuend is restricted to the number 10 and the choice of the subtrahend is a number from 0-10. In FIG. 9, the minuend is the number 10, and the subtrahend is the number 6.

At difficulty level 2, some examples of subtraction problems that may be presented either in horizontal or vertical form are 10−0, 10−1, 10−2, 10−3, 10−10, etc.

Subtraction—Difficulty Level 3: Subtracting a Subtrahend of 0-10 from a Minuend of 10-20.

Figure 10:
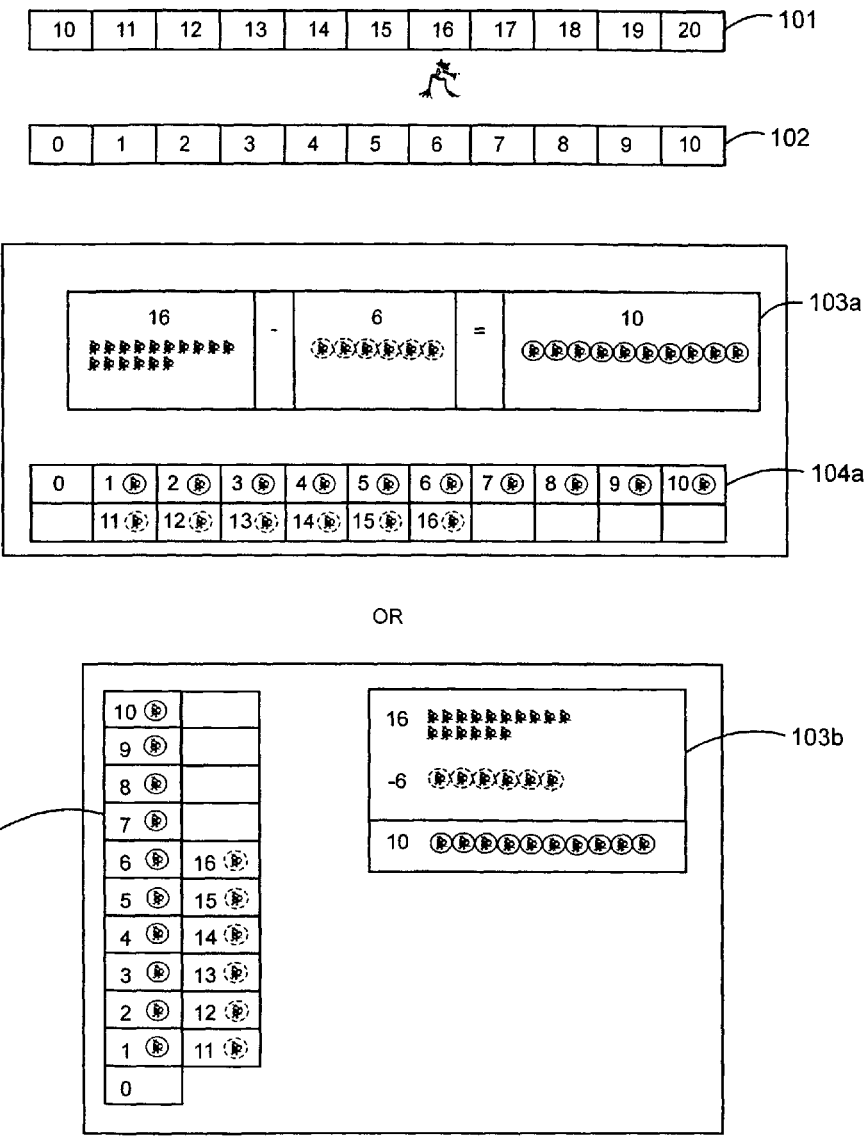
FIG. 10 is a schematic drawing of a display for learning subtraction at a third level of difficulty.

Referring to FIG. 10, a display for learning subtraction at difficulty level 3 is shown in the learning mode. In a manner similar to difficulty level 1, the display comprises a list of minuends 101, a list of subtrahends 102, a horizontal or vertical subtraction fact table 103*a* or 103*b* respectively, and a horizontal or vertical subtraction display grid 104*a* or 104*b* respectively.

Difficulty level 3 follows the same basic method as difficulty level 1 except for a few differences. The choice of the minuend is a number from 10-20, and the choice of the subtrahend is a number from 0-10. The choice of subtrahend is restricted to that number which when subtracted from the minuend results in an answer of 10. In FIG. 10, the minuend is the number 16, and the subtrahend is the number 6.

Also, since the minuend in difficulty level 3 is a number from 10-20, the subtraction display grid, which displays icons (in this case insects) in sets of ten, is two rows or columns instead of one row or column as displayed for difficulty level 1. The first row or column contains the numbers from 0-10 and forms the first base ten, and the second row or column contains the numbers from 11 to the minuend and forms the second base ten. The numbers in the second row or column line up with the numbers in the first row or column such that 11 in the second row or column lines up with the 1 in the first row or column, 12 lines up with 2, 13 with 3, etc.

At difficulty level 3, some examples of subtraction problems that may be presented either in horizontal or vertical form are 10-0, 11-1, 12-2, 13-3, 20-10, etc.

Subtraction—Difficulty Level 4: Subtracting a Subtrahend of 2-10 from a Minuend of 11-20.

Figure 11:
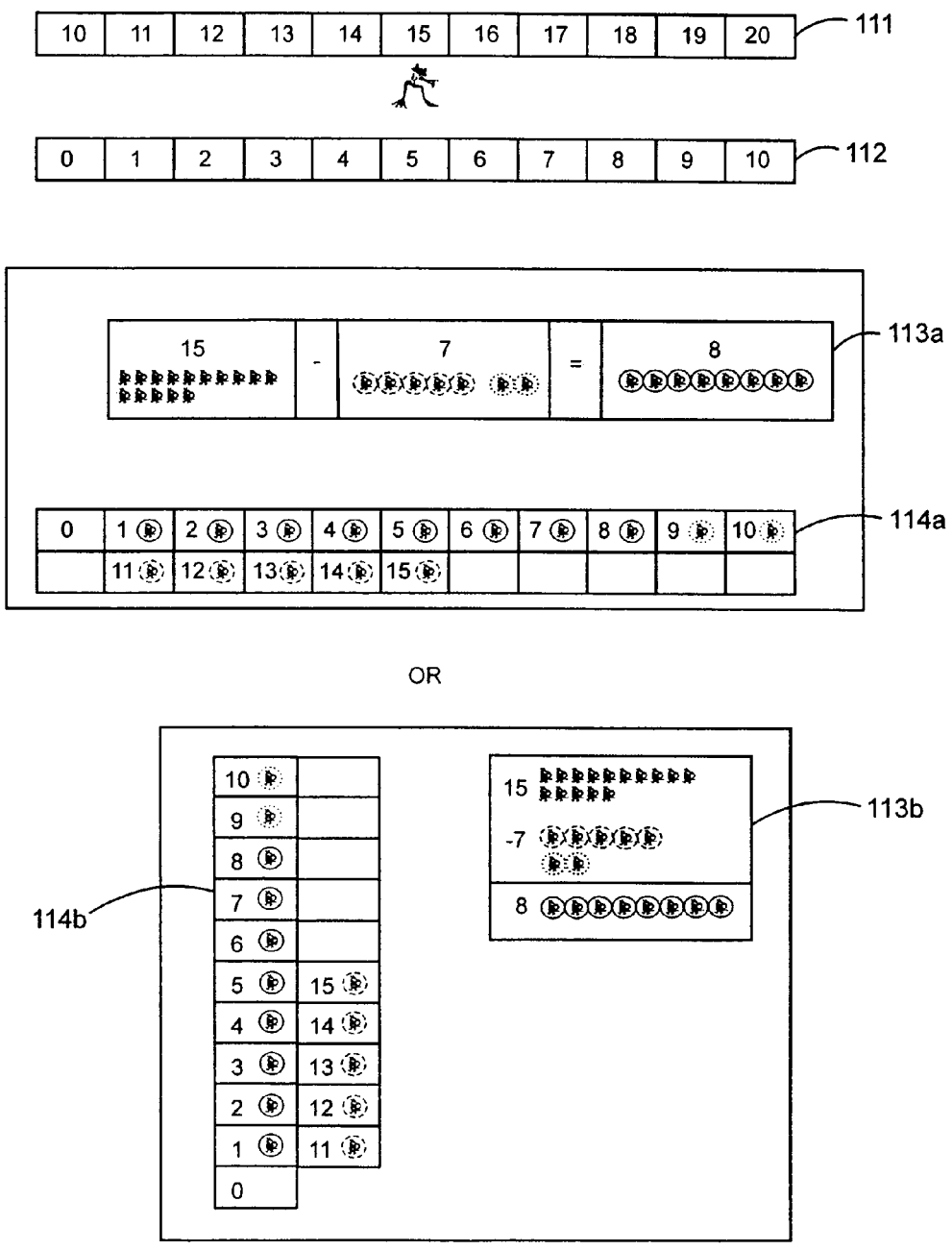
FIG. 11 is a schematic drawing of a display for learning subtraction at a fourth level of difficulty.

Referring to FIG. 11, a display for learning subtraction at difficulty level 4 is shown in the learning mode. In a manner similar to difficulty level 1, the display comprises a list of minuends 111, a list of subtrahends 112, a horizontal or vertical subtraction fact table 113a or 113b respectively, and a horizontal or vertical subtraction display grid 114a or 114b respectively. The icons in the vertical fact table 113b may be displayed horizontally or vertically, but vertically is preferred.

Difficulty level 4 follows the same basic method as difficulty level 3 except for a few differences. The choice of the minuend is a number from 11-20, and the choice of the subtrahend is a number from 2-10. The choice of subtrahend is restricted to a number which when subtracted from the minuend results in an answer of that is a one-digit number. In FIG. 11, the minuend is the number 15, and the subtrahend is the number 7.

Because the answer is a one-digit number and the minuend is a two-digit number, the subtraction process straddles two sets of base tens in the subtraction display grid 114a or 114b and leads to a carry-over process. Therefore, the color change of the icons associated with the minuend based on the number chosen for the subtrahend, straddles the second row or column and the first row or column of the subtraction display grid. To more clearly illustrate the carry-over process, the change in color of the icons in the second base ten is different from the change in the first base ten. Thus, referring to FIG. 11, the icons associated with the numbers 15, 14, 13, 12 and 11 (the second base ten) change from green to purple, while the icons associated with the numbers 10 and 9 (the first base ten) change from green to pink. The purple and pink icons, now associated with the subtrahend, are regrouped in a group of five and a group of two and displayed in the subtraction fact table 113a or 113b. Also, when the icons associated with the subtrahend move from the subtraction display grid to the subtraction fact table, there is a noticeable pause between the group of five and the group of two to emphasize the regrouping.

At difficulty level 4, some examples of subtraction problems that may be presented either in horizontal or vertical form are 11-7, 13-9, 17-8, 18-10, etc.

Subtraction—Difficulty Level 5: Subtracting a Subtrahend of 0-9 from a Minuend of 10-100.

Figure 12:
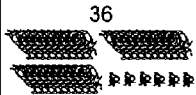
FIG. 12 is a schematic drawing of a display for learning subtraction at a fifth level of difficulty.

Referring to FIG. 12, a display for learning subtraction at difficulty level 5 is shown in the learning mode. In a manner similar to difficulty level 1, the display comprises a list of minuends 121, a list of subtrahends 122, a horizontal or vertical subtraction fact table 123a or 123b respectively, and a horizontal or vertical subtraction display grid 124a or 124b respectively.

Difficulty level 5 follows the same basic method as difficulty level 4 except for a few differences. The choice of the minuend is a number from 10-100, and the choice of the subtrahend is a number from 0-9. Due to the large number of potential minuends, the list of minuends is displayed scrolling through the numbers from 10-100, with ten sequential numbers appearing in the display at any one time. Further, when choosing the minuend, the user is required to press a first button for the first numeral and a second button for the second numeral (and a third button if the minuend is to be 100). Pressing the first button immediately limits the display of the list of minuends to the ten possible choices (eleven choices if the first number is 1) dictated by the choice of the first numeral. For example, pressing the numeral 1 as the first numeral of the minuend restricts the choice of the minuend to 10, 11, 12, 13, 14, 15, 16, 17, 18, 19 or 100. In FIG. 12, the minuend is the number 36, and the subtrahend is the number 9.

Since the minuend is potentially any number from 10-100, the subtraction display grid 124a or 124b may have from 1-10 rows or columns depending on the minuend. In FIG. 12, since the minuend is 36, there are four rows or columns. The rows or columns are lined up in an analogous manner as described above for difficulty level 3. In addition, the choice of minuend and subtrahend potentially gives rise to a regrouping and carry-over process as described above for difficulty level 4. The regrouping and carry-over process follows the same basic method as described above for difficulty level 4.

At difficulty level 5, some examples of subtraction problems that may be presented either in horizontal or vertical form are 41-2, 51-3, 69-7, 74-7, etc.

Subtraction—Difficulty Level 6: Subtracting a Subtrahend of 10-100 from a Minuend of 10-100.

Figure 13:
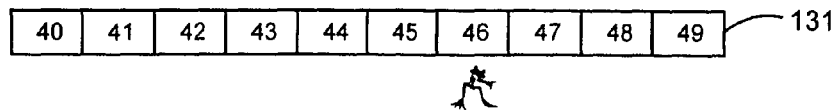
FIG. 13 is a schematic drawing of a display for learning subtraction at a sixth level of difficulty.
Figure 13:
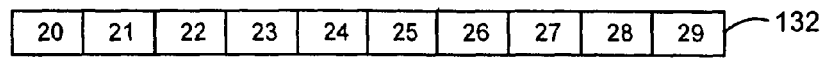
Figure 13:
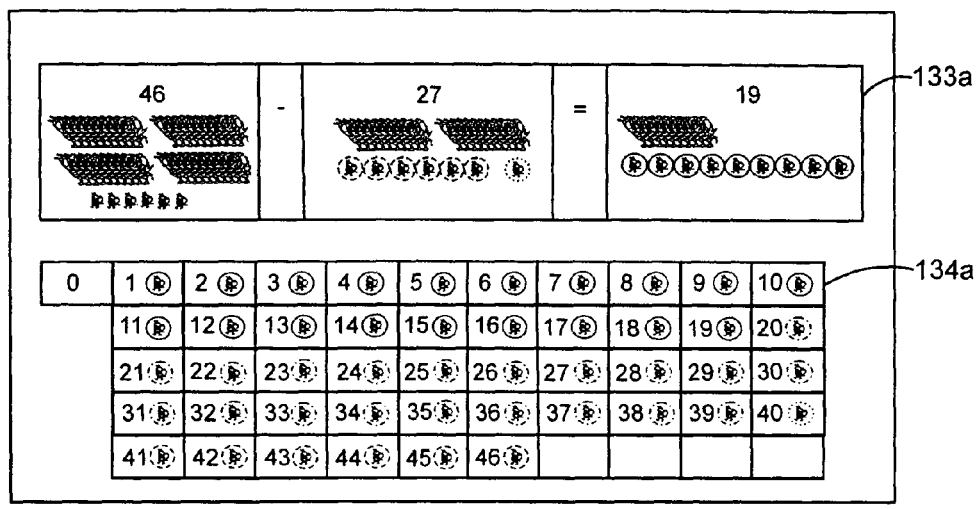
Figure 13:
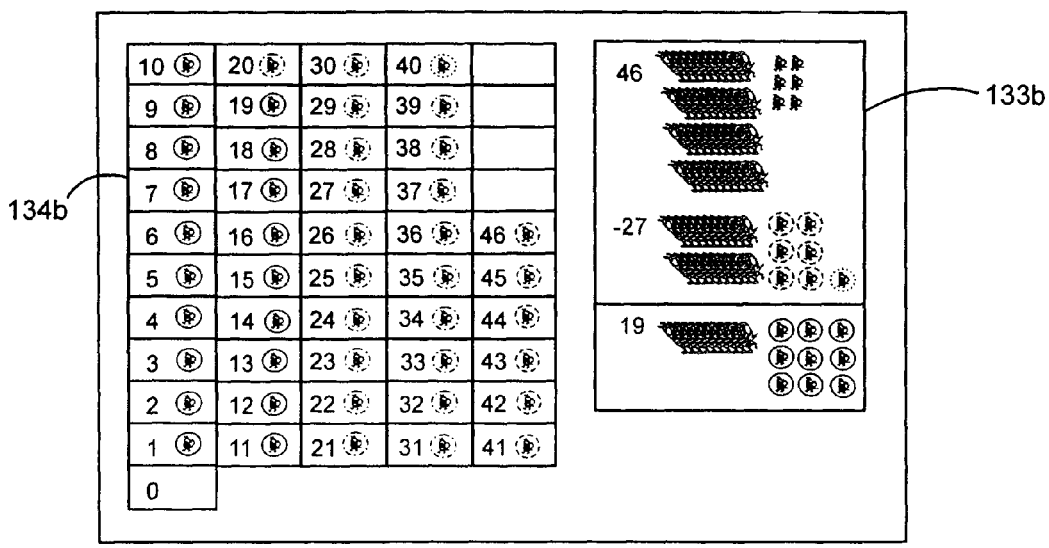

Referring to FIG. 13, a display for learning subtraction at difficulty level 6 is shown in the learning mode. In a manner similar to difficulty level 1, the display comprises a list of minuends 131, a list of subtrahends 132, a horizontal or vertical subtraction fact table 133a or 133b respectively, and a horizontal or vertical subtraction display grid 134a or 134b respectively.

Difficulty level 6 follows the same basic method as difficulty level 5 with a few differences. The list of minuends 131 and the list of subtrahends 132 both comprise numbers from 10-100. Thus, due to the large number of potential minuends and subtrahends, the lists of minuends and subtrahends are both displayed scrolling through the numbers from 10-100 and the minuend and subtrahend are chosen in a manner analogous to the minuend in difficulty level 5.

In FIG. 13, the minuend is the number 46, and the subtrahend is the number 27. The individual icons of the minuend and subtrahend are regrouped in the subtraction fact table 133a or 133b into groups of ten. For example, referring to FIG. 13, the individual icons of the minuend are grouped into four groups of ten and one group of six. All of the icons associated with the minuend are the same color. Movement of the icons associated with the minuend from the subtraction fact table 133a or 133b to the subtraction display grid 134a or 134b is accomplished by moving each of the four groups of ten sequentially followed by moving each of the remaining six individual icons sequentially.

The individual icons of the subtrahend are grouped in two groups of ten, one group of 6 and one group of one as a result of the carry-over process. The icons associated with the subtrahend are given a different color (e.g. purple) in the subtraction display grid. Then, to simulate subtraction, the icons associated with the subtrahend are moved, with the assistance of Zaba, from the subtraction display grid 134a or 134b to the subtraction fact table 133*a* or 133*b* to be associated with the number 27 in the subtraction fact table 133*a* or 133*b*. Movement of the 27 icons of the subtrahend from the subtraction display grid 134*a* or 134*b* to the subtraction fact table 133*a* or 133*b* is accomplished in three stages. First, the first group of ten icons is taken from the number 40, 39, 38, 37, 36, 35, 34, 33, 32 and 31 in the subtraction fact table and jump in unison to the subtraction fact table. Next, the second group of ten icons is taken from the number 30, 29, 28, 27, 26, 25, 24, 23, 22 and 21 in the subtraction fact table and jump in unison to the subtraction fact table. Then, the icons associated with the number 46, 45, 44, 43, 42 and 41 in the subtraction display grid 134*a* or 134*b* are moved to positions 26, 25, 24, 23, 22 and 21 in the subtraction display grid 134*a* or 134*b*, followed by a change of color and subsequent jumping from the subtraction display grid 134*a* or 134*b* to the subtraction fact table 133*a* or 133*b*. Finally, the last icon associated with the number 20 in the subtraction display grid 134*a* or 134*b* changes color and jumps to the subtraction fact table 133*a* or 133*b*. In the subtraction fact table, there is a separation between the six icons moved and the one icon moved to indicate that carry-over has occurred. Thus, the three groups of icons associated with the subtrahend (i.e. the two groups of ten, the one group of six and the one group of one) have different colors and the movement of these groups from the subtraction display grid to the subtraction fact table takes place in three separate movements to simulate the mental computation method behind the subtraction.

Due to the potentially large number of rows or columns for the subtraction display grid, the subtraction display grid may be displayed at reduced size to fit on the display screen of the calculating device.

At difficulty level 6, some examples of subtraction problems that may be presented either in horizontal or vertical form are 41-26, 51-35, 69-17, 74-28, etc.

Multiplication Module:

There are ten levels of difficulty in the multiplication module as follows: multiplication by 1; multiplication by 2; multiplication by 3; multiplication by 4; multiplication by 5; multiplication by 6; multiplication by 7; multiplication by 8; multiplication by 9; multiplication by 10. Only difficulty level 4 is described in detail below as the other levels function in an analogous manner.

Multiplication—Difficulty Level 4: Multiplication by 4.

Figure 14:
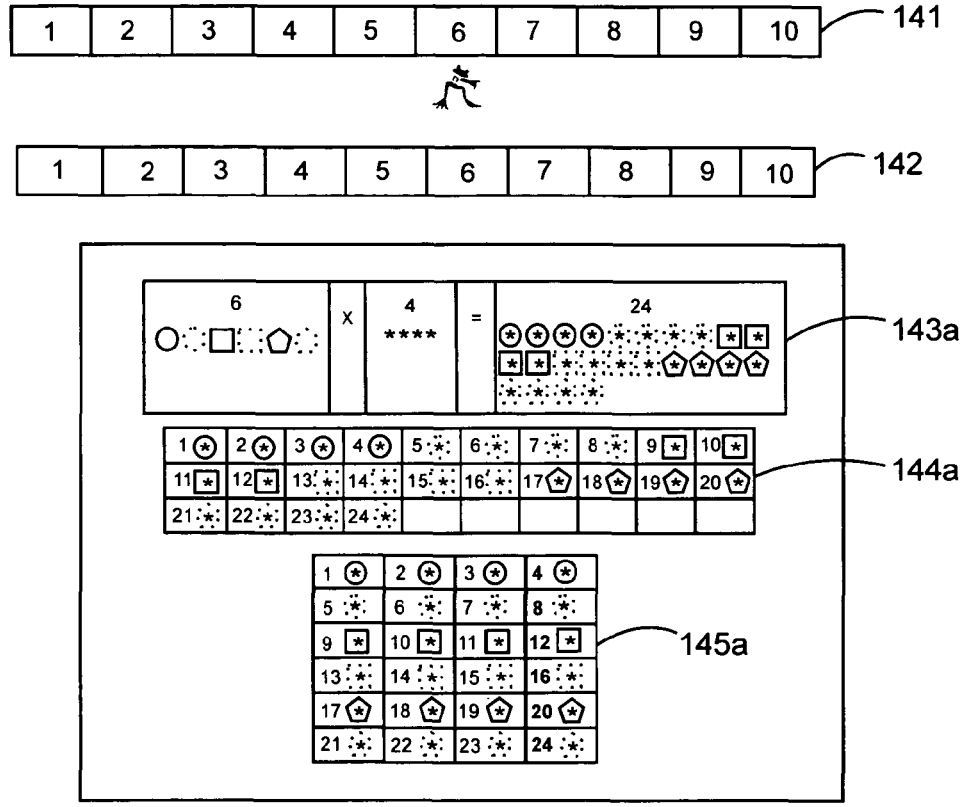
FIG. 14 is a schematic drawing of a display for learning multiplication.
Figure 14:
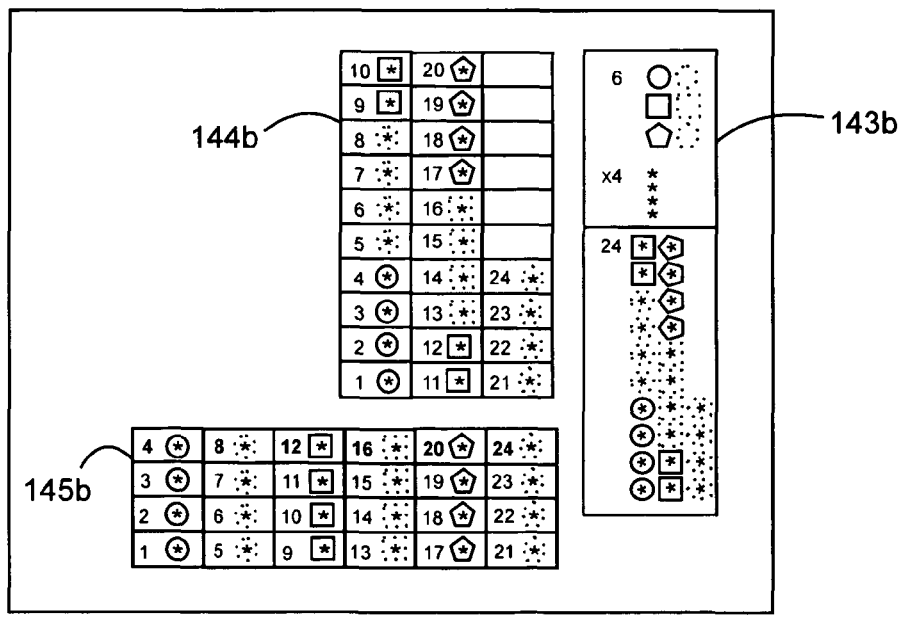

Referring to FIG. 14, a display for learning multiplication at difficulty level 4 is shown in the learning mode. Zaba, the animated character, is displayed peeking/looking over a horizontally oriented list of multipliers 141 prompting the user to select a number from 1-10. The user selects the multiplier, e.g. the number 6, by pressing the appropriately numbered button on the calculating device. After the user chooses the multiplier, a horizontally oriented list of multiplicands 142 is displayed and the user is prompted by Zaba to select a second number from 10 1-10. At difficulty level 4 the only permissible choice of multiplicand is the number 4. Zaba also helps prompt the selection of the multiplicand by peeking/looking over the list of multiplicands. Zaba remains on the display to help and watch the learning process.

Once the multiplier and multiplicand are chosen, the device displays a multiplication fact table 143*a* or 143*b*, either horizontally 143*a* or vertically 143*b*. The multiplication fact table contains: the multiplier, e.g. the number 6, displayed together with six individual icons each of the six having a different color, e.g. red, green, purple, blue, orange and pink (in FIG. 14, color is distinguished by shape and line style); the multiplicand, e.g. the number 4, together with four individual icons, each of the four having the same color but having a different color than the ones used for the multiplier, e.g. black; a "×" sign between the multiplier and multiplicand, an "=" sign or an underline after the second multiplicand; all followed by an answer (product), e.g. the number 24, together with twenty-four individual icons of the same style as the icons of the multiplicand. The twenty-four icons of the answer are grouped in groups of four, each group of four having one of the colors used for the icons of the multiplier.

Once the multiplication fact table is displayed, the device regroups the individual icons from the multiplication fact table into a first multiplication display grid 144*a* or 144*b*, either horizontally 144*a* or vertically 144*b*. The first multiplication display grid displays the icons in sets of ten. There are three rows or columns having ten boxes each, the boxes numbered sequentially from 1-24. The first row or column is the first base ten, the second row or column is the second base ten, and the third row or column is the third base ten. Icons in the first multiplication display grid 144*a* or 144*b* are regrouped into a second multiplication display grid 145*a* or 145*b* to display the numbers and icons in a 6 by 4 grid. The numbers 4, 8, 12, 16, 20 and 24 are bold to emphasize counting by 4.

In more detail with reference to FIG. 14, the method for multiplication at difficulty level 4 is described as follows.

The calculating device is turned ON and Multiplication Level 4 is selected by the user. The calculating device displays the list of multipliers 141 with Zaba looking over and prompting the user to select a multiplier. The user selects multiplier 6 by pressing the button labeled with the number 6 on the calculating device. The calculating device displays the multiplier 6 in the multiplication fact table 143*a* or 143*b*. One second later the calculating device displays six icons associated with the multiplier, each icon having a different color. At the same time the calculating device hides the list of multipliers and leaves Zaba to help with the process of solving the multiplication problem. The calculating device moves Zaba close to the multiplier in the multiplication fact table to look at the six icons along with number 6, and then moves to the place where the "×" sign is displayed in faded tones to prompt the user to press the button on the calculating device labeled with the "×" sign. Zaba moves within a 1 or 2 second time frame on the display screen and exhibits some animation, e.g. eye, limb and/or finger movement.

The user presses the "×" button and the calculating device displays the "×" sign in brighter tones. The calculating device displays the list of multiplicands 142 in which the permissible selection 4 is displayed in a darker tone than the impermissible selections 1, 2, 3, 5, 6, 7, 8, 9 and 10. Zaba prompts the user to select a multiplicand by pointing to the number 4. The user selects the multiplicand, e.g. the number 4, by pressing the appropriate button on the calculating device. The multiplicand is then displayed in the multiplication fact table 143*a* or 143*b* and the list of multiplicands is hidden by the calculating device. One second later four icons of the same style and color are displayed associated with the multiplicand in the multiplication fact table.

Zaba moves to the place where the "=" sign or the underline is displayed in faded tones in the multiplication fact table 143*a* or 143*b* to prompt the user to press the button on the calculating device labeled with the "=" sign. The user presses the "=" button on the calculating device, the "=" sign or the underline is displayed in bold tones.

One second later, Zaba touches the four icons associated with the multiplicand in the multiplication fact table turning them red. The four red icons jump in a group of four to the first multiplication display grid 144*a* or 144*b* to take their places with numbers 1-4. Silhouettes of the four icons of the multiplicand remain in the multiplication fact table 143*a* or 143*b*. Music is played during the movement of the icons. A red checkmark is displayed in the multiplication fact table next to the multiplier, i.e. next to the number 6.

One second later, the calculator displays the silhouettes of the four icons associated with the multiplicand restored to a green color in the multiplication fact table. Zaba touches the four now green icons which then jump in a group of four to the first multiplication display grid 144*a* or 144*b* to take their places with numbers 5-8. Silhouettes of the four icons of the multiplicand remain in the multiplication fact table 143*a* or 143*b*. Music is played during the movement of the icons. A green checkmark is displayed in the multiplication fact table next to the multiplier, i.e. next to the number 6, under the red checkmark.

One second later, the calculator displays the silhouettes of the four icons associated with the multiplicand restored to a purple color in the multiplication fact table. Zaba touches the four now purple icons which then jump in a group of four to the first multiplication display grid 144*a* or 144*b* to take their places with numbers 9-12. As these four icons move, the first two of the four move first and the second two of the four move second, with a small but noticeable pause between the two groups of two, thereby simulating regrouping and carry-over. Silhouettes of the four icons of the multiplicand remain in the multiplication fact table 143*a* or 143*b*. Music is played during the movement of the icons. A purple checkmark is displayed in the multiplication fact table next to the multiplier, i.e. next to the number 6, under the green checkmark.

One second later, the calculator displays the silhouettes of the four icons associated with the multiplicand restored to a blue color in the multiplication fact table. Zaba touches the four now blue icons which then jump in a group of four to the first multiplication display grid 144*a* or 144*b* to take their places with numbers 13-16. Silhouettes of the four icons of the multiplicand remain in the multiplication fact table 143*a* or 143*b*. Music is played during the movement of the icons. A blue checkmark is displayed in the multiplication fact table next to the multiplier, i.e. next to the number 6, under the purple checkmark.

One second later, the calculator displays the silhouettes of the four icons associated with the multiplicand restored to an orange color in the multiplication fact table. Zaba touches the four now orange icons which then jump in a group of four to the first multiplication display grid 144*a* or 144*b* to take their places with numbers 17-20. Silhouettes of the four icons of the multiplicand remain in the multiplication fact table 143*a* or 143*b*. Music is played during the movement of the icons. An orange checkmark is displayed in the multiplication fact table next to the multiplier, i.e. next to the number 6, under the blue checkmark.

One second later, the calculator displays the silhouettes of the four icons associated with the multiplicand restored to a pink color in the multiplication fact table. Zaba touches the four now pink icons which then jump in a group of four to the first multiplication display grid 144*a* or 144*b* to take their places with numbers 21-24. Silhouettes of the four icons of the multiplicand remain in the multiplication fact table 143*a* or 143*b*. Music is played during the movement of the icons. A pink checkmark is displayed in the multiplication fact table next to the multiplier, i.e. next to the number 6, under the orange checkmark.

The answer, i.e. the number 24, is displayed flashing in the first multiplication display grid 144*a* or 144*b*. One second later, the calculator displays a second multiplication display grid 145*a* or 145*b* and, with the aid of Zaba, the icons in the first multiplication display grid jump to the second multiplication grid with the icons and numbers regrouped in a 6×4 grid. Zaba touches the icons associated with the numbers 24, 23, 22 and 21 and they jump in unison from the first multiplication display grid to the bottom row or last column of the second multiplication display grid. Zaba then touches the icons associated with the numbers 20, 19, 18 and 17, followed by 16, 15, 14 and 13, followed by 12 and 11 and then a pause before 10 and 9, followed by 8, 7, 6, and 5, and finally followed by 4, 3, 2 and 1, the groups of icons being moved to the second multiplication display grid in groups. One second later the calculator closes the first multiplication display grid 144*a* or 144*b*, and the second multiplication display grid 145*a* or 145*b* remains displayed with numbers and icons regrouped in a 6 by 4 grid with the numbers 4, 8, 12, 16, 20, 24 in bold tones. Zaba points to 4, 8, 12, 16, 20, 24 to count by four, thereby teaching the user that multiplication is a sequence of addition of the multiplicand. The answer, 24, is displayed in the second multiplication display grid as a larger flashing number.

The user is prompted by Zaba to enter the number 24 by pressing the appropriate buttons on the calculating device. If the user enters the correct answer, the number 24 in the multiplication fact table 143*a* or 143*b* changes color and the manner in which it flashes, and Zaba, with animation and musical accompaniment, moves the icons from the second multiplication display grid 145*a* or 145*b* to the answer in the multiplication fact table 143*a* or 143*b*. Each of two groups of ten icons is moved followed by movement of the remaining four icons individually.

At difficulty level 4, some examples of multiplication problems that may be presented either in horizontal or vertical form are 2×4, 3×4, 4×4, 9×4, 10×4, etc.

Division Module:

There are ten levels of difficulty in the division module as follows: division by 1; division by 2; division by 3; division by 4; division by 5; division by 6; division by 7; division by 8; division by 9; division by 10. Only difficulty level 4 is described in detail below as the other levels function in an analogous manner.

Division—Difficulty Level 4: Division by 4.

Figure 15:
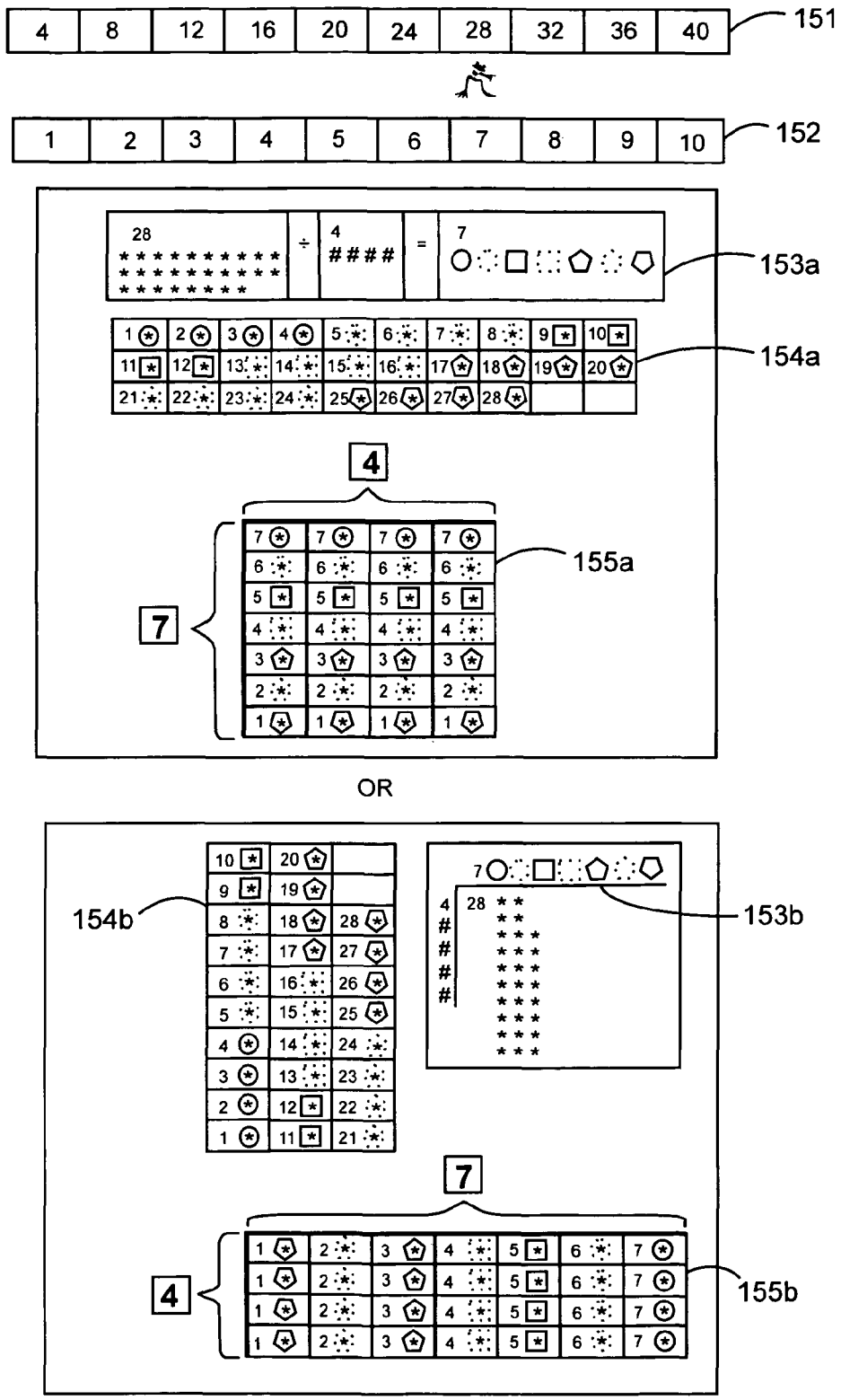
FIG. 15 is a schematic drawing of a display for learning division.

Referring to FIG. 15, a display for learning division at difficulty level 4 is shown in the learning mode. Zaba, the animated character, is displayed peeking/looking over a horizontally oriented list of dividends 151 prompting the user to select a number from the group consisting of 4, 8, 12, 16, 20, 24, 28, 32, 36 and 40. The user selects the dividend, e.g. the number 28, by pressing the appropriately numbered buttons on the calculating device. After the user chooses the dividend, a horizontally oriented list of divisors 152 is displayed and the user is prompted by Zaba to select a second number from 1-10. At difficulty level 4 the only permissible choice of divisor is the number 4. Zaba also helps prompt the selection of the divisor by peeking/looking over the list of divisors. Zaba remains on the display to help and watch the learning process.

Once the dividend and divisor are chosen, the device displays a division fact table 153*a* or 153*b*, either horizontally 153*a* or vertically 153*b*. The division fact table contains: the dividend, e.g. the number 28, optionally displayed together with twenty-eight individual icons grouped in sets of ten with one partial group of eight icons, each individual icon having the same color, e.g. black; the divisor, e.g. the number 4, together with four individual icons each having a different color, e.g. gray, green, yellow and orange (in FIG. 15, color is distinguished by shape and line style); and an answer (quotient), e.g. the number 7 with individual icons represented by geometric shapes. The horizontal division fact table 153*a* contains a "÷" sign between the dividend and divisor and an "=" sign after the divisor. The vertical division fact table 153b contains the long division format comprising vertical and horizontal lines separating the dividend, divisor and answer.

Icons are displayed in sets of ten in a first division display grid 154a or 154b, either horizontally 154a or vertically 154b. There are three rows or columns having ten boxes each, the boxes numbered sequentially from 1-28. The first row or column is the first base ten, the second row or column is the second base ten, and the third row or column is the third base ten. Icons in the first division display grid 154a or 154b are regrouped into a second division display grid 155a or 155b to display the numbers and icons in a 7 by 4 grid or 4 by 7 grid.

In more detail with reference to FIG. 15, the method for division at difficulty level 4 is described as follows.

The calculating device is turned ON and Division Level 4 is selected by the user. The calculating device displays the list of dividends 151 with Zaba looking over and prompting the user to select a dividend. The user selects dividend 28 by pressing the button labeled with the number 2 and then the button labeled with the number 8 on the calculating device. The calculating device displays the dividend 28 in the division fact table 153a or 153b grouped in sets of ten with one partial group of eight icons, and the list of dividends is hidden leaving Zaba to help with the process of solving the division problem. One second later the calculating device displays the first division display grid 154a or 154b. With animation, and music playing Zaba motions the icons to populate the first division display grid 154a or 154b with the numbers 1-28 and with twenty-eight individual icons associated with each of the numbers 1-28. The twenty-eight icons are all colored the same, e.g. black, at this time. Zaba spends some time pointing at the twenty-eight icons. The silhouettes of the twenty-eight icons remain displayed in the division fact table 153a or 153b for back reference.

Zaba moves to the division facts table to prompt the user to press the "÷" button on the calculating device. Once the "÷" button is pressed, the "÷" sign or the vertical line in the long division format is displayed in bold tones and the calculating device displays the list of divisors 152 in which the permissible selection 4 is displayed in a darker tone than the impermissible selections 1, 2, 3, 5, 6, 7, 8, 9 and 10. Zaba prompts the user to select a divisor by pointing to the number 4. The user selects the divisor, e.g. the number 4, by pressing the appropriate button on the calculating device.

The divisor is then displayed in the division fact table 153a or 153b and the list of divisors is hidden by the calculating device. One second later four icons of different color, e.g. gray, green, yellow and orange, are displayed associated with the divisor in the division fact table.

Zaba moves to the division fact table 153a or 153b to prompt the user to press the button on the calculating device labeled with the "=" sign. The user presses the "=" button on the calculating device, and the "=" sign or the horizontal line in the long division format is displayed in bold tones.

Zaba moves to the divisor in the division fact table and points to the four colored icons counting them off one at a time. The second division display grid 155a or 155b is displayed without numbers or icons but with a large number 28 as a "wallpaper" inside a faded gray display grid. Zaba points to the four colored icons which with music playing move to align themselves above each faded column or row in the second division display grid 155a or 155b and to change each column or row to a color corresponding to the colored icon associated with the column or row.

Zaba moves to the first division display grid 154a or 154b and touches the four icons associated with the numbers 28, 27, 26 and 25, thereby changing their color from black to red. The four red icons jump out of the first division display grid and are divided into four rows or columns of the second division display grid 155a or 155b. The four icons occupy the boxes in the bottom row or first column of the second division display grid 155a or 155b, thereby changing the faded gray grid lines of that row or column to black. Music is played as the four icons jump and the number 1 appears in each of the boxes in the first row or column. In a similar manner, Zaba continues to touch the icons in the first division display grid 154a or 154d in groups of four causing the icons to jump to the next available row or column in the second division display grid 155a or 155b, and causing the boxes in each subsequent row or column to be populated with the numbers 2, 3, 4, 5, 6 and 7 respectively. The other six colors to which the icons are changed are, for example, fuchsia, orange, blue, purple, green and violet. There is a noticeable pause between the icons associated with numbers 12, 11 and 10, 9 when they are moved to simulate regrouping and carry over in subtraction. In this manner, the user learns that division is a sequence of subtracting the same numeral (i.e. sub-multiple) from the dividend.

The first division display grid 154a or 154b is closed. On the second division display grid 155a or 155b, which is a 7 by 4 or 4 by 7 grid, the calculator displays a large horizontal bracket and a large vertical bracket on the top and left (or right if desired) sides of the grid respectively. The calculator displays the number 7 in association with the bracket along the side which is seven boxes long and the number 4 with the bracket along the side which is four boxes along. Zaba moves close to the number 7 to prompt the user to press the button labeled with 7 on the calculating device. When the user presses the button labeled with the number 7, the calculator displays the answer 7 enlarged and flashing in the division fact table 153a or 153b along with seven icons. Zaba moves to the answer in the division fact table to point out the answer.

At difficulty level 4, some examples of division problems that may be presented either in horizontal or vertical form are 4÷4, 8÷4, 24÷4, etc.

Practice and Testing Modes:

Each difficulty level in each module may also have practice and testing modes.

The user may toggle to the practice mode from the learning mode by pressing the Next button. In the practice mode, the fact table and display grids may be displayed either in vertical and horizontal form. The user selects numbers by pressing the appropriate buttons and the numbers are displayed in the fact table and the display grid as described above. The user presses a numbered button to enter the answer. The calculating device displays Zaba as a less active helper and does not highlight the answer as in the learning mode. The correctness of the answer is indicated as described above and a score board keeps track of the number of correct/incorrect answers.

The user may toggle from the practice mode to the testing mode by pressing the Next button. The fact table presents numbers in non-sequential order, either in vertical or horizontal form without showing the display grid at all. Numbers appropriate for the module and level are chosen randomly by the calculating device. Zaba is a less active helper in the testing mode. The correctness of the answer is indicated as described above and a score board keeps track of the number of correct/incorrect answers. When the user is stuck, pressing the Help button activates the learning mode to review the learning method.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for teaching arithmetic on an electronic calculating device having a processor, input means and a display, comprising the steps of:
receiving, via said input means, a selection of first and second operands and of an arithmetical operation to be performed upon said first and second operands, the arithmetical operation being addition;
displaying upon said display the first operand as a first collection of icons whose number is equal to the first operand;
displaying upon said display the second operand as a second collection of icons whose number is equal to the second operand;
displaying upon said display a grid for facilitating visualization of a computed answer to said arithmetical operation in a base ten format, said grid comprising multiple rows or columns of ten cells each to represent said base ten format, each occupied cell representing a unit of one in the computed answer, the cells initially being unoccupied;
using the processor, moving the icons of the first collection to occupy cells of the grid, each icon occupying a single cell, said occupying being performed row by row or column by column and resulting in one row or column respectively being only partially occupied by icons, the number of occupied cells in the partially occupied row or column being equal to the ones place value of the first operand;
using the processor, regrouping the icons of the second collection into two groups, the first group containing a number of icons equal to the number of unoccupied cells in the partially occupied row or column, the second group containing the remaining icons of the second collection and being made visually distinct from the first group;
using the processor, moving the icons of the first group to the unoccupied cells of the partially occupied row or column so as to create a fully occupied row or column, each icon of the first group occupying a single cell; and
using the processor, and following a noticeable pause after the moving of the icons of the first group, moving the icons of the second group to partially occupy the next row or column, each icon of the second group occupying a single cell,
wherein said moving of the icons of the second group provides a visualization of arithmetic carry-over and wherein the pause enhances the visualization of the arithmetic carry-over or of the regrouping.

2. The method of claim 1, wherein the moving of the second group of icons comprises displaying an animated character appearing to carry the second group of icons so as to enhance the visualization of arithmetic carry-over.

3. The method of claim 1 wherein said second group of icons is displayed in a different color from said first group in order to enhance the visualization of arithmetic carry-over.

4. The method of claim 1 wherein the second group of icons being made visually distinct from the first group of icons comprises the second group of icons being made a different color from the first group of icons.

5. A method of teaching arithmetic using an electronic calculating device having a processor, a display and input means, said method comprising:
receiving, via said input means, user input indicative of first and second operands and an arithmetical operation to be performed upon said operands, said operation being one of addition, subtraction, multiplication and division;
displaying upon said display the first operand as a first collection of icons whose number is equal to the first operand;
displaying upon said display the second operand as a second collection of icons whose number is equal to the second operand;
displaying upon said display a grid for facilitating visualization of a computed answer to said arithmetical operation in a base ten format, said grid comprising multiple rows or columns of ten cells each to represent said base ten format, each occupied cell representing a unit of one in the computed answer, the cells initially being unoccupied;
using the icons of said first and second collections, occupying cells within said display grid with icons to visually represent said answer, each of said cells being occupied by at most one icon, said occupying resulting in a total number of icons within said grid that is equal to said computed answer;
wherein said occupying comprises regrouping the icons from the second collection into two groups, the second group being made visually distinct from the first group, the first and second groups occupying adjacent rows or columns respectively of the grid in order to provide a visualization of arithmetic carry-over,
wherein said occupying further comprises moving the first group of icons and, after a noticeable pause, moving the second group of icons, said pause enhancing the visualization of arithmetic carry-over or of said regrouping,
wherein the regrouping, the moving of the first group of icons, and the moving of the second group of icons are performed using the processor.

6. The method of claim 5, wherein the electronic calculating device further comprises a speaker and further comprising playing musical notes forming a melodic sequence over said speaker in association with said moving.

7. The method of claim 5, wherein said second group of icons being made visually distinct from the first group of icons comprises the second group of icons being displayed in a different color from said first group of icons, in order to enhance the visualization of arithmetic carry-over.

8. The method of claim 5, wherein the moving of the second group of icons comprises displaying an animated character appearing to carry the second group of icons so as to further enhance the visualization of arithmetic carry-over.

9. The method of claim 5, wherein the electronic calculating device further comprises a level of difficulty selector and further comprising receiving user input from said level of difficulty selector indicative of a selected level of difficulty, said selected level of difficulty restricting a set of operands from which either or both of said first and second operands may be chosen.

10. The method of claim 5 wherein said arithmetical operation is multiplication or division and wherein said occupying further comprises coloring each of a plurality of groups of icons in said grid a distinct color, wherein the number of icons in each group is equal to one of the first and second operands and wherein the number of groups in said plurality is equal to the other of the first and second operands.

11. The method of claim 10 wherein said grid is a first grid and further comprising:
displaying on said display a second grid having a number of rows equal to one of the first and second operands and a number of columns equal to the other of the first and second operands, each intersection of a row and column forming a cell; and moving the icons from the first grid to the second grid such that each of the distinctly colored groups of icons of said plurality fully occupies a row or column of said second grid with one icon per cell.

12. The method of claim 5 wherein each of said icons represents a living organism.

13. The method of claim 5 wherein said input means comprises buttons.

14. The method of claim 5 wherein said cells comprise boxes.

15. The method of claim 5 further comprising, subsequent to said occupying of said cells with icons to visually represent said answer, prompting for user input of said answer via said input means in order to provide tactile reinforcement of the answer.

16. The method of claim 5 wherein said electronic calculating device further comprises one or more chips for permitting remote control of the device and further comprising utilizing the one or more chips to remotely control the device.

17. A method of teaching arithmetic using an electronic calculating device comprising a processor, input means and a display, the method comprising:

receiving, via said input means, user input indicative of first and second operands and of an arithmetical operation to be performed upon said first and second operands, the arithmetical operation being subtraction, the first operand being a minuend greater than ten, the second operand being a subtrahend that, when subtracted from said minuend, will result in a difference that is a positive number less than ten;

displaying upon said display the minuend as a collection of icons whose number is equal to the minuend;

displaying upon said display a grid for facilitating visualization of a computed answer to said arithmetical operation in a base ten format, said grid comprising multiple rows or columns of ten cells each to represent said base ten format, the cells initially being unoccupied;

using the processor, moving the icons of the collection to occupy cells within the grid, each icon occupying a single cell, said occupying being performed row by row or column by column and resulting in at least one row or column respectively being completely occupied by icons and exactly one row or column being only partially occupied by icons, wherein the number of occupied cells in the partially occupied row or column is equal to the ones place value of the minuend;

using the processor, changing an appearance of a subset of the icons within the grid in order to represent the subtrahend, the number of icons in the subset being equal to the subtrahend, the subset including the icons of the partially occupied row or column and one or more icons of an adjacent row or column, so as to provide a visualization of arithmetic carry-over, wherein the changed appearance of the icons of the partially occupied row or column differs from the changed appearance of the one or more icons of the adjacent row or column to enhance the visualization of arithmetic carry-over.

18. The method of claim 17 further comprising removing the subset of icons from the grid such that the number of icons remaining in the grid equals the computed answer which is the difference between the minuend and subtrahend.

19. The electronic calculating device of claim 17 wherein said cells comprise boxes.

20. An electronic calculating device for use in teaching arithmetic, the device comprising:

input means;

a display;

a central processing unit; and memory storing software that, upon execution by said central processing unit, causes said device to:

receive, via said input means, user input indicative of first and second operands and an arithmetical operation to be performed upon said operands, said operation being one of addition, subtraction, multiplication and division;

display upon said display the first operand as a first collection of icons whose number is equal to the first operand;

display upon said display the second operand as a second collection of icons whose number is equal to the second operand;

display upon said display a grid for facilitating visualization of a computed answer to said arithmetical operation in a base ten format, said grid being made up of multiple rows or columns of ten cells each to represent said base ten format, each occupied cell representing a unit of one in the computed answer, the cells initially being unoccupied;

using the icons of said first and second collections, occupy cells within said display grid with icons to visually represent said answer, each of said cells being occupied by at most one icon, said occupying resulting in a total number of icons within said grid that is equal to said computed answer, wherein said occupying comprises regrouping the icons from the second collection into two groups, the second group being made visually distinct from the first group, the first and second groups occupying adjacent rows or columns respectively of the grid in order to provide a visualization of arithmetic carry-over, and wherein there is a noticeable pause between the occupying by the first group and the occupying by the second group.

21. The electronic calculating device of claim 20 wherein the second group of icons being made visually distinct from the first group of icons comprises the second group of icons being made a different color from the first group of icons.

* * * * *